United States Patent
Kiyohara et al.

(10) Patent No.: US 12,359,921 B2
(45) Date of Patent: Jul. 15, 2025

(54) VEHICLE CONTROL DEVICE AND HOST VEHICLE POSITION ESTIMATION METHOD

(71) Applicant: Hitachi Astemo, Ltd., Hitachinaka (JP)

(72) Inventors: Masahiro Kiyohara, Tokyo (JP); Takeshi Ogata, Tokyo (JP); Hiroki Ota, Tokyo (JP); Shinichi Amaya, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 261 days.

(21) Appl. No.: 17/927,096

(22) PCT Filed: Feb. 1, 2021

(86) PCT No.: PCT/JP2021/003488
§ 371 (c)(1),
(2) Date: Nov. 22, 2022

(87) PCT Pub. No.: WO2021/240884
PCT Pub. Date: Dec. 2, 2021

(65) Prior Publication Data
US 2023/0243657 A1  Aug. 3, 2023

(30) Foreign Application Priority Data
May 26, 2020 (JP) ................ 2020-091076

(51) Int. Cl.
*G01C 21/00* (2006.01)
*G01C 21/30* (2006.01)
*G08G 1/0968* (2006.01)

(52) U.S. Cl.
CPC .......... *G01C 21/30* (2013.01); *G08G 1/0968* (2013.01)

(58) Field of Classification Search
CPC ........ G01C 21/30; G01C 21/28; G01C 21/00; G08G 1/0968; G08G 1/09626;
(Continued)

(56) References Cited

U.S. PATENT DOCUMENTS
2017/0227970 A1* 8/2017 Taguchi ............... G05D 1/0257

FOREIGN PATENT DOCUMENTS
JP   H7-12909 A   1/1995
JP   2006-349405 A   12/2006
(Continued)

OTHER PUBLICATIONS

English Translation of International Search Report issued in corresponding International Application No. PCT/JP2021/003488, dated Apr. 13, 2021.

*Primary Examiner* — Shardul D Patel
(74) *Attorney, Agent, or Firm* — Foley & Lardner LLP

(57) ABSTRACT

A host vehicle position estimation unit includes an absolute position estimation unit that estimates a first vehicle position based on absolute position information acquired from a GNSS. The host vehicle position estimation unit further includes a relative position estimation unit that estimates a second vehicle position based on relative position information acquired from outside the host vehicle; a traveling state determination unit that determines a change of a traveling state of the host vehicle based on vehicle information or satellite information; a difference computation unit that computes a time synchronized difference between the first and the second vehicle positions; a learning unit that accumulates the difference as time-series data for each traveling state and learns a correction amount of the first vehicle position for each traveling state based on the time-series data; and a position correction unit that corrects the first vehicle position based on the correction amount.

11 Claims, 11 Drawing Sheets

(58) Field of Classification Search
CPC ........ G08G 1/165; G08G 1/166; G08G 1/167;
G01S 19/14; G01S 19/48; G01S 19/485;
H04W 4/027; H04W 4/029; H04W 4/40;
G06V 20/58
USPC ....................................................... 701/446
See application file for complete search history.

(56) References Cited

FOREIGN PATENT DOCUMENTS

| | | |
|---|---|---|
| JP | 2007-057419 A | 3/2007 |
| JP | 2013-246038 A | 12/2013 |
| JP | 2017-138282 A | 8/2017 |

\* cited by examiner

FIG. 5
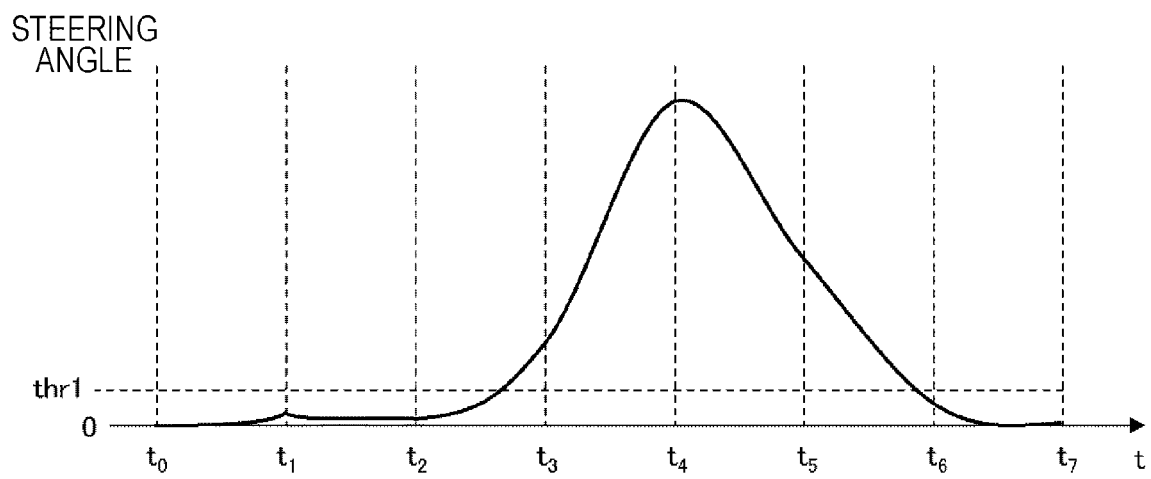
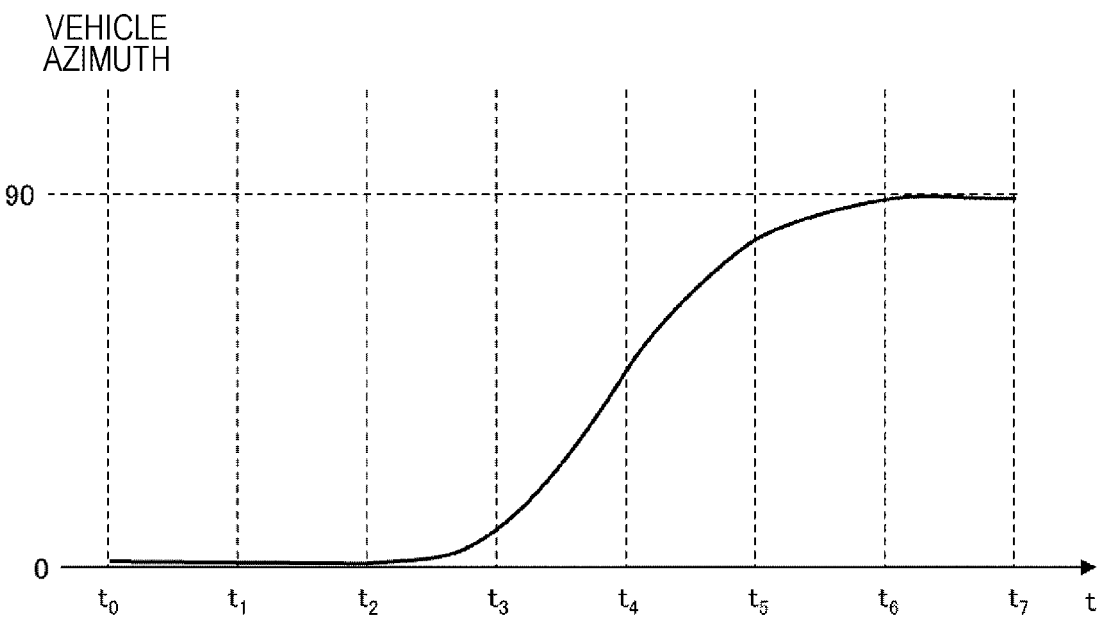

| No. | VEHICLE SPEED RANGE [km/h] | DURATION [sec] | ESTIMATED TRAVELING STATE |
|---|---|---|---|
| 1 | 0 TO 4 | 1 | STOP/CONGESTION |
| 2 | 80 TO 180 | 5 | TRAVELING IN HIGHWAY |
| 3 | 5 TO 34 | 3 | TRAVELING IN RESIDENTIAL SECTION |
| 4 | 35 TO 79 | 10 | TRAVELING IN URBAN AREA |

FIG. 11
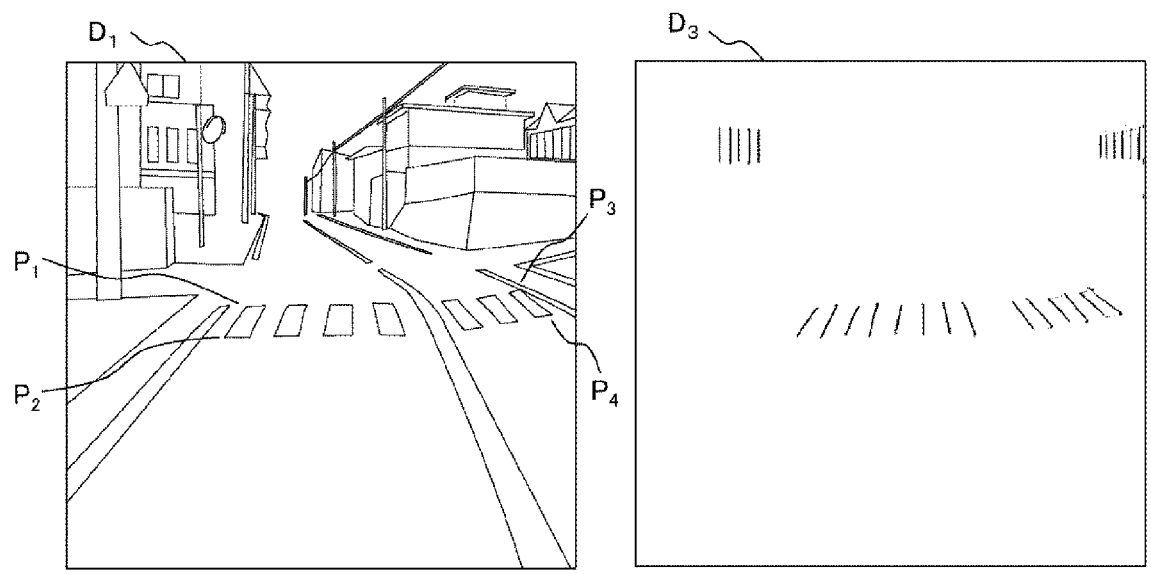
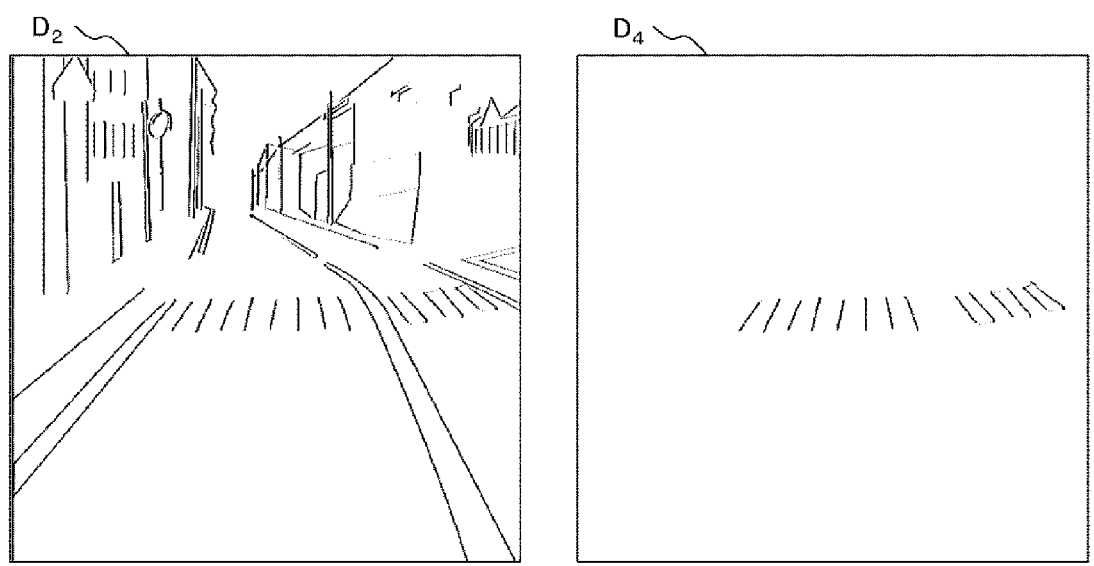

VEHICLE CONTROL DEVICE AND HOST VEHICLE POSITION ESTIMATION METHOD

TECHNICAL FIELD

The present invention relates to a vehicle control device and a host vehicle position estimation method for estimating a host vehicle position on a map by collating a surrounding environment structure where a host vehicle travels with structure information recorded in map information.

BACKGROUND ART

Hitherto, as a technology for correcting a current position of a vehicle detected by a positioning device, there has been proposed a technology for more accurate host vehicle position estimation in which host vehicle position estimation using satellite positioning and host vehicle position estimation based on recognition of a landmark using an external sensor such as a camera mounted on the vehicle and collation with a landmark position recorded in advance in map information are combined.

For example, in PTL 1, paragraph 0038 describes that "the first vehicle position detection unit 23 detects the first vehicle position, which is a vehicle position on the map, based on the measurement result of the positioning unit 2 and the map information stored in the map database 5", and paragraph 0039 describes that "the first vehicle position detection unit 23 matches the white-line edge points, extracted from a camera-captured image, against the position information on white lines, included in the map information, to correct the vehicle position". That is, PTL 1 discloses an automated driving system that corrects a host vehicle position obtained by satellite positioning based on a detection result of a camera to improve accuracy in estimating the host vehicle position.

Further, claim 1 of PTL 1 describes "an automated driving system that performs automated driving control of a vehicle, the automated driving system including: a positioning unit configured to measure a position of the vehicle; a map database that stores map information; a first vehicle position detection unit configured to detect a first vehicle position based on a measurement result of the positioning unit and the map information of the map database, the first vehicle position being a vehicle position on a map; a traveling scene identification unit configured to identify a traveling scene of the vehicle based on the first vehicle position detected by the first vehicle position detection unit and the map information of the map database; a second vehicle position detection unit configured to detect a second vehicle position by performing position detection processing, associated in advance with the traveling scene, based on a captured image of a camera mounted on the vehicle or a detection result of a radar sensor mounted on the vehicle, the measurement result of the positioning unit, and the map information of the map database, the second vehicle position being a vehicle position on the map; a determination unit configured to determine whether a difference between the first vehicle position and the second vehicle position is equal to or smaller than a threshold value; and an automated driving control unit that performs automated driving control of the vehicle based on the second vehicle position in a case where it is determined that the difference between the first vehicle position and the second vehicle position is equal to or smaller than the threshold value or that performs the automated driving control of the vehicle based on the first vehicle position in a case where it is determined that the difference between the first vehicle position and the second vehicle position is not equal to or smaller than the threshold value. That is, PTL 1 discloses the automated driving system that compares the first vehicle position with the second vehicle position obtained by performing the position detection processing associated with the traveling scene, and switches a vehicle position to be adopted according to the difference between the first vehicle position and the second vehicle position, thereby improving accuracy in estimating a host vehicle position.

CITATION LIST

Patent Literature

PTL 1: JP 2017-138282 A

SUMMARY OF INVENTION

Technical Problem

PTL 1 discloses means for selecting and switching a method of detecting the second vehicle position according to a white line type of a traveling lane, an inclination of a traveling road surface, and a traveling environment such as inside and outside of a tunnel to select a position calculation method according to the traveling scene, thereby improving accuracy.

However, in the position detection processing for obtaining the second vehicle position, only a position detection processing method is switched according to the environment, and for example, only a detection position of a host vehicle can be switched according to a fixed environment of a traveling point such as a white line drawn on a road surface or a tunnel.

On the other hand, a global navigation satellite system (GNSS) used in an automated driving system outputs a detected host vehicle position deviated due to an obstacle environment such as a building present around a receiver and arrangement of a navigation satellite on the date and time, but since the position of the host vehicle with this positional deviation is used as it is, there is a problem that accuracy deteriorates.

In view of such a problem, an object of the present invention is to provide a vehicle control device and a host vehicle position estimation method capable of appropriately learning a correction amount of a host vehicle position estimated based on a GNSS according to an environmental change.

Solution to Problem

In order to solve the above problems, a vehicle control device of the present invention includes a host vehicle position estimation unit that estimates a position of a host vehicle, in which the host vehicle position estimation unit includes: an absolute position estimation unit that estimates a first vehicle position based on absolute position information acquired from a global navigation satellite system (GNSS); a relative position estimation unit that estimates a second vehicle position based on relative position information acquired from an outside of the host vehicle; a traveling state determination unit that determines a change of a traveling state of the host vehicle based on vehicle information or satellite information; a difference computation unit that computes an amount of a difference between the first vehicle position and the second vehicle position in a state where time synchronization is performed; a learning unit that accumulates the amount of the difference as time-series data for each traveling state and learns a correction amount of the first vehicle position for each traveling state based on the accumulated time-series data; and a position correction unit that corrects the first vehicle position based on the correction amount calculated by the learning unit.

Further, a host vehicle position estimation method of the present invention includes: estimating a first vehicle position based on absolute position information acquired from a GNSS; estimating a second vehicle position based on relative position information acquired from outside a host vehicle; determining a change of a traveling state of the host vehicle based on vehicle information or satellite information; computing an amount of a difference between the first vehicle position and the second vehicle position in a state where time synchronization is performed; accumulating the amount of the difference as time-series data for each traveling state and learning a correction amount of the first vehicle position for each traveling state based on the accumulated time-series data; and correcting the first vehicle position based on the learned correction amount.

Advantageous Effects of Invention

In positioning in the GNSS, there is a deviation in the position of the host vehicle due to an influence of obstruction, diffraction, and reflection by surrounding structures, an influence of an error caused by a change of a behavior of the host vehicle, or an influence of a combination of satellites used for positioning. Such a deviation does not greatly vary while a surrounding structure environment is constant, and a traveling environment in which the change of the behavior of the host vehicle is small, and the combination of satellites used for positioning does not change is constant.

For this reason, in a case where a constant traveling environment continues, if an accurate host vehicle position can be obtained using an external sensor, a deviation of positioning coordinates with respect to the position can be obtained, and thus, more accurate positioning coordinates can be calculated using the deviation. In a case where the traveling environment changes, as the deviation as the correction amount is calculated again, it is possible to obtain an optimum correction amount for each traveling environment.

Therefore, with the vehicle control device and the host vehicle position estimation method according to the present invention, as an appropriate correction amount (offset) of a positioning position is learned according to a traveling environment and a traveling state, and an influence of a traveling state change is removed, it is possible to frequently perform highly accurate estimation of a host vehicle position in a map even if the traveling environment and the traveling state change.

BRIEF DESCRIPTION OF DRAWINGS

FIG. 5 is a schematic diagram illustrating a steering angle and a vehicle azimuth in the example of the traveling vehicle that makes a turn.

FIG. 11 is an explanatory diagram when a crosswalk is recognized by an external recognition sensor.

DESCRIPTION OF EMBODIMENTS

Hereinafter, embodiments of a vehicle control device according to the present invention will be described with reference to the drawings.

First Embodiment

Figure 1:
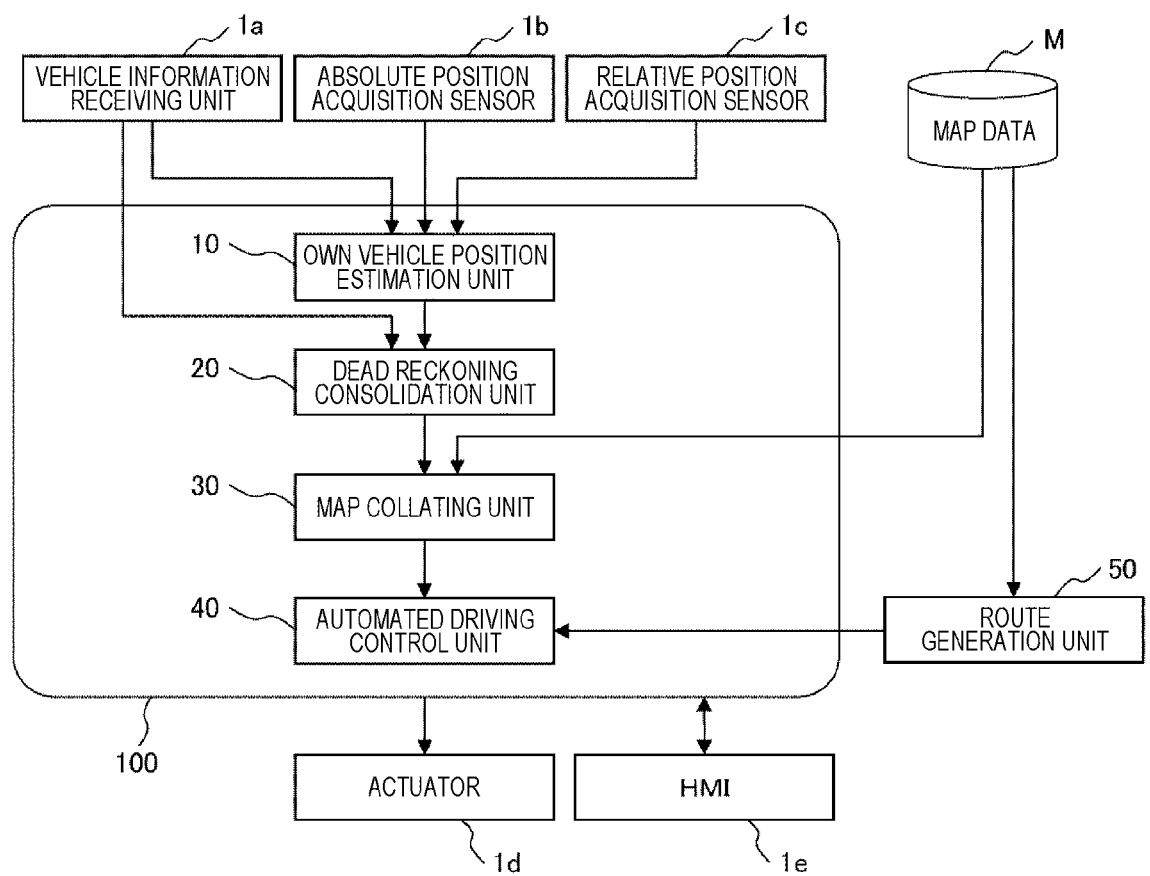
FIG. 1 is a configuration diagram of an electronic control unit including a host vehicle position estimation unit according to a first embodiment.

FIG. 1 is a block diagram illustrating a vehicle control device 100 including a host vehicle position estimation unit 10 according to a first embodiment of the present invention. As illustrated in FIG. 1, the vehicle control device 100 includes the host vehicle position estimation unit 10, a dead reckoning consolidation unit 20, a map collating unit 30, and an automated driving control unit 40. In addition, the vehicle control device 100 is connected to a vehicle information receiving unit 1a, an absolute position acquisition sensor 1b, a relative position acquisition sensor 1c, an actuator 1d, a human machine interface (HMI) 1e, a storage device storing map data M, and a route generation unit 50.

The host vehicle position estimation unit 10 estimates a host vehicle position based on vehicle information from the vehicle information receiving unit 1a, absolute position information from the absolute position acquisition sensor 1b, and relative position information from the relative position acquisition sensor 1c, and transmits the position estimation result to the dead reckoning consolidation unit 20.

The dead reckoning consolidation unit 20 calculates the host vehicle position based on the vehicle information from the vehicle information receiving unit 1a and the position estimation result of the host vehicle position estimation unit 10, and outputs the host vehicle position to the map collating unit 30.

The map collating unit 30 estimates the host vehicle position in a map based on the position estimation result of the dead reckoning consolidation unit 20 and the map data M. Further, the result of the map collating unit 30 is transmitted to the automated driving control unit 40.

The automated driving control unit 40 controls the actuator 1d based on the host vehicle position estimation result in the map and a driving route generated by the route generation unit 50 to implement automated driving of a vehicle V.

Examples of the actuator 1d include various actuators for driving a steering system, a driving system, a braking system, and the like of the vehicle V, and examples of the HMI 1e include a steering wheel operated by a driver, an accelerator pedal, a brake pedal, a sensor for detecting operation amounts thereof, and the like.

Note that the vehicle control device 100 is specifically an electronic control unit (ECU) including hardware such as an arithmetic device such as a central processing unit (CPU), a main storage device such as a semiconductor memory, an auxiliary storage device, and a communication device, and implements each function of the host vehicle position estimation unit 10 and the like by the arithmetic device executing a program loaded in the main storage device, and details of each unit will be described below while appropriately omitting such a well-known technology in the computer field.

<Host Vehicle Position Estimation Unit 10>

Figure 2:
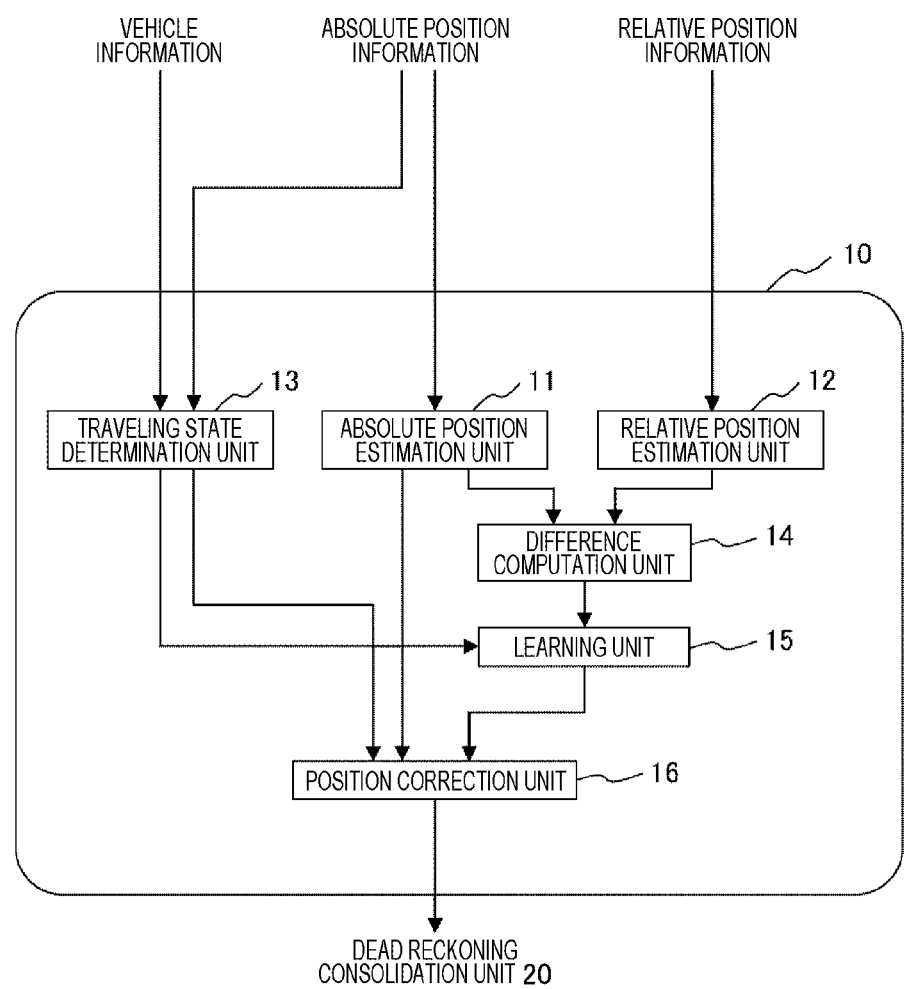
FIG. 2 is a block diagram of the host vehicle position estimation unit according to the first embodiment.

FIG. 2 is a block diagram illustrating details of the host vehicle position estimation unit 10. As illustrated herein, the host vehicle position estimation unit 10 includes an absolute position estimation unit 11, a relative position estimation unit 12, a traveling state determination unit 13, a difference computation unit 14, a learning unit 15, and a position correction unit 16.

<Absolute Position Estimation Unit 11>

The absolute position estimation unit 11 estimates the host vehicle position by using one or more sensors for recognizing an absolute position of the host vehicle based on a signal (absolute position information and satellite positioning state information) obtained from an absolute position acquisition sensor such as a reception device of the GNSS or a reception device capable of receiving a positioning radio wave, such as a pseudolite (pseudo satellite). Note that estimation of the position and posture of the host vehicle by the absolute position acquisition sensor is frequently performed, and for example, a positioning interval of the GNSS is often about 0.1 seconds to 1 second, but it can be said that an update cycle of this positioning interval is sufficiently short for a route guidance function of the automated driving system.

Furthermore, in the positioning by the GNSS, a positioning radio wave transmitted from a positioning satellite is received, and a distance between the positioning satellite and a receiver antenna is measured based on an arrival time of the positioning radio wave.

Since the satellite arrangement information is superimposed on the positioning radio wave, a position of the positioning satellite is known, and when a plurality of distances from the positioning satellite are obtained, the position of the receiver can be calculated. However, in a case where there is an obstruction between the positioning satellite and the receiver antenna or there is a structure in the vicinity, the distance between the positioning satellite and the receiver antenna may be inaccurate due to an influence of obstruction, diffraction, or reflection. Furthermore, it is assumed that not only the host vehicle position but also a traveling direction and traveling speed of the host vehicle that can be measured by observing a frequency variation of the positioning radio wave from each satellite using the Doppler phenomenon are obtained from the reception device of the GNSS.

Note that, since the pseudolite is a system similar to the GNSS, the positioning satellite can be replaced with a pseudo satellite signal transmitter, and the pseudolite has characteristics similar to those of the GNSS.

<Relative Position Estimation Unit 12>

The relative position estimation unit 12 estimates the host vehicle position with high accuracy by using a C2X device or a marker reading device. The C2X device or the marker reading device obtains a relative position with respect to a marker installed in a traveling environment of the host vehicle or a relative position with respect to position information output from a transmitter, and thus is also referred to as the relative position acquisition sensor 1*c*. Then, the relative position estimation unit 12 calculates and outputs the absolute position of the host vehicle based on the marker or the position information of the transmitter, and the relative position of the host vehicle with respect to the position information.

Since the marker or the transmitter to be observed by the relative position acquisition sensor 1*c* has a short distance from the host vehicle and a position error due to diffraction/reflection does not occur, the position estimation result of the relative position estimation unit 12 can be expected to have higher accuracy than the position estimation result of the absolute position estimation unit 11. On the other hand, the estimation of the position and posture of the host vehicle by the relative position estimation unit 12 is performed only in a place where the marker exists or a place where C2X communication is established. Therefore, it can be said that it is discrete in terms of time or space.

The C2X device and the marker reading device will be described. The C2X device refers to, for example, a beacon receiver that recognizes a beacon transmitter arranged in an environment, a device for road-to-vehicle communication with an access point device such as wireless local area network (LAN) communication or Bluetooth communication, a vehicle-to-vehicle communication device for receiving information from another vehicle, and the like. The marker reading device detects marker information such as a type, a position, and a posture of the marker such as a characteristic mark or sign, or a magnetic tag arranged in an environment by using a corresponding sensor such as a camera or a magnetic sensor, and transmits the marker information to the relative position estimation unit 12.

<Traveling State Determination Unit 13>

The traveling state determination unit 13 has one or both of a function of determining that the same traveling environment continues and a function of determining a timing at which the traveling state has changed, because a deviation tendency of the GNSS changes due to a change of (1) the vehicle information such as a turning angle and a vehicle speed, (2) the satellite information such as satellite arrangement and the number of visible satellites, and the like. For the vehicle information and the reception environment, parameter numerical values are accumulated as time-series information, and it is determined that the traveling state has changed in a case where a predetermined parameter numerical value has changed, a case where a change amount during a certain time has exceeded a predetermined threshold value, a case where accumulation of a change amount of a parameter has exceeded a certain value, or the like. In addition, the traveling state determination unit 13 transmits the output result to the learning unit 15.

The vehicle information will be described. The vehicle information includes vehicle speed information obtained from a wheel speed pulse sensor that is arranged near each wheel and outputs a pulse each time the wheel rotates by a certain angle, a wheel speed pulse number sensor that outputs the number of wheel speed pulses per unit time, and the like, in addition to a rotation speed sensor arranged in an axle portion, steering angle information obtained from a steering angle sensor that outputs an angle of a steering wheel, a steering wheel angle sensor that outputs a rotation amount of a steering wheel, and the like, shift position information indicating a forward/backward movement state, a transmission state, and the like.

The satellite information will be described. The satellite information indicates various parameters related to GNSS positioning, such as a positioning fix state obtained from the GNSS receiver, accuracy indexes such as position accuracy and speed accuracy, accuracy degradation indexes such as pDOP and vDOP, the number of satellites used for positioning, a reception signal strength of each positioning satellite, and a multipath flag.

<Difference Computation Unit 14>

The difference computation unit 14 calculates a difference between the host vehicle positions output from the absolute position estimation unit 11 and the relative position estimation unit 12. As described above, the absolute position estimation unit 11 frequently outputs the estimated position, but the deviation may increase depending on a traveling situation. In addition, the relative position estimation unit 12 outputs the estimated position with high accuracy less frequently than the absolute position estimation unit 11. Therefore, when calculating the difference between these estimated positions, the estimated positions of the same time are not output in some cases, and thus it is necessary that a time synchronization function is provided. After the output times of the absolute position estimation unit 11 and the relative position estimation unit 12 are synchronized, the amount of the difference between the outputs is calculated. This difference may be a Euclidean distance obtained by adding the square of a difference in latitude, longitude, and height between the estimated positions, or may be a distance divided into a front-rear component in a traveling direction, a left-right component, and a height component with respect to the traveling direction at that time.

The distance calculated in this manner is output to the learning unit 15.

<Learning Unit 15>

The learning unit 15 calculates a correction amount for correcting the estimated position from the absolute position estimation unit 11 based on the amount of the difference calculated by the difference computation unit 14. For example, the difference between the outputs of the absolute position estimation unit and the relative position estimation unit output by the difference computation unit 14 at a time point when the marker is first observed and the relative position estimation unit 12 outputs the estimated position after the traveling state determination unit 13 outputs a change timing of the traveling state may be used as the correction amount as it is. Further, the correction amount may be retained, and the same correction amount may be continuously output to the position correction unit 16 until the traveling state determination unit 13 outputs the change timing of the traveling state next time.

<Position Correction Unit 16>

The position correction unit 16 receives the outputs of the absolute position estimation unit 11, the traveling state determination unit 13, and the learning unit 15, corrects the estimated position from the absolute position estimation unit 11, and outputs the correction result. For example, in a state where the traveling state determination unit 13 determines that the same traveling state continues, the correction amount of the learning unit 15 is used as it is, and a position corrected by adding the correction amount to the position output from the absolute position estimation unit 11 is output. On the other hand, in a state where the traveling state determination unit 13 determines that the traveling state is not continued, the position obtained by correcting the position output from the absolute position estimation unit 11 is output using a value obtained by decreasing the correction amount of the learning unit 15 by a predetermined ratio. The position correction unit 16 also outputs the accuracy index of the correction result.

Next, a content of processing performed by each unit according to the present embodiment will be described using a flowchart as necessary.

<Content of Processing Performed by Absolute Position Estimation Unit 11>

First, JP 6482720 B2 is known as a technical literature related to detection of a vehicle position used for the absolute position estimation unit 11. This publication discloses a positioning device (locator device) and a positioning method for performing positioning with lane-level accuracy by using a GNSS receiver or the like.

In the surveying field, there is a highly accurate positioning method (carrier wave phase positioning method) executed by measuring a carrier wave phase of a positioning signal from a GNSS receiver. In this carrier wave phase positioning method, a two-frequency GNSS receiver having a highly accurate clock is required, which results in high cost. On the other hand, a conventional code positioning method executed by the host vehicle position estimation device can be executed using an inexpensive one-frequency GNSS receiver.

However, since the accuracy of the clock of such a GNSS receiver is low (about 1 μs in a case of an in-vehicle GNSS receiver), it is necessary to correct a bias error (receiver clock bias error) of the clock of the GNSS receiver with high accuracy in order to obtain high positioning accuracy.

In order to solve this problem, JP 6482720 B2 discloses a positioning device capable of correcting a positioning error caused by the receiver clock bias error of the GNSS receiver with high accuracy.

The absolute position estimation unit 11 of the present embodiment estimates the absolute position by using such an existing technology.

Furthermore, the absolute position estimation unit 11 outputs not only a positioning position but also the satellite information indicating a satellite that has transmitted the positioning radio wave used to calculate the positioning position (the satellite used for positioning) and a radio wave strength from each satellite.

<Content of Processing Performed by Relative Position Estimation Unit 12>

Figure 3:
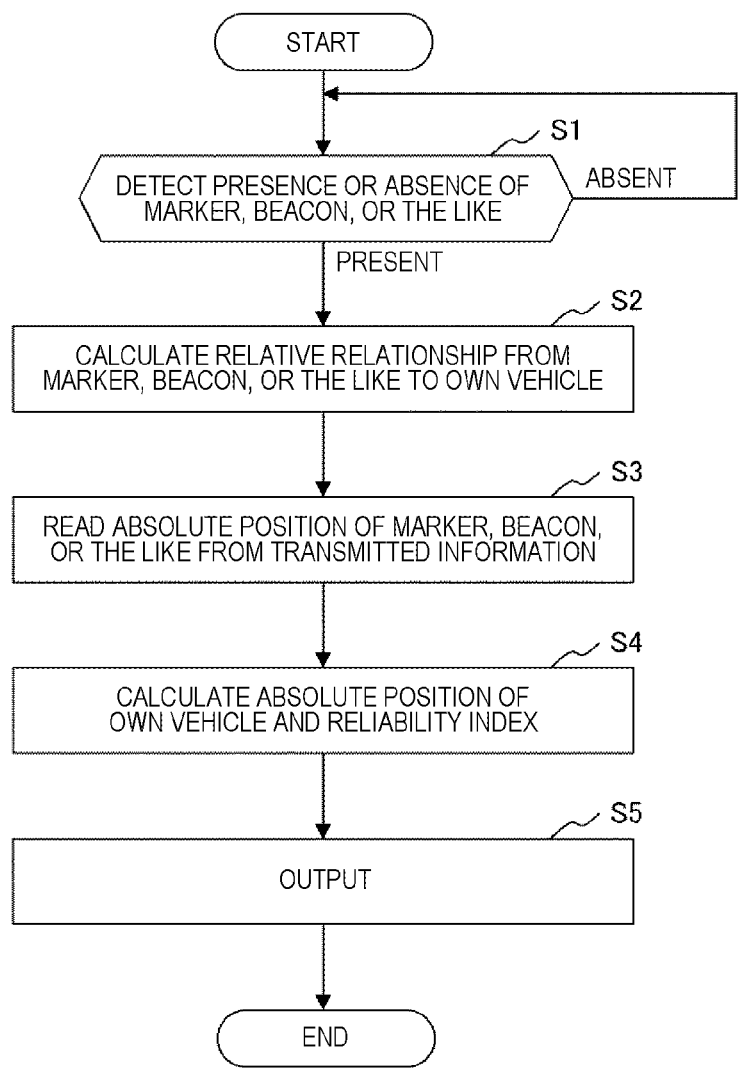
FIG. 3 is a flowchart illustrating a content of processing performed by a relative position estimation unit.

Next, the relative position estimation unit 12 will be described with reference to the flowchart of FIG. 3. The flowchart illustrated in FIG. 3 is continuously executed during the host vehicle position estimation operation of the host vehicle position estimation unit 10.

In Step S1, the relative position estimation unit 12 determines the presence or absence of a marker, a beacon, or the like serving as a reference when the relative position of the host vehicle is obtained. When a marker, a beacon, or the like is present within a detectable range of the marker reading device or the C2X device which is a specific example of the relative position acquisition sensor 1c, the relative position estimation unit 12 can estimate the absolute position of the host vehicle, and thus, first, the presence or absence of a marker, a beacon, or the like is determined based on outputs of these devices. Specifically, in a case where an image marker (a two-dimensional barcode represented by a QR code (registered trademark)) serves as the reference, the marker reading device determines that the marker is present in a case where a cutout symbol (finder pattern) can be detected and a contrast ratio and a size thereof are equal to or larger than a certain value, and determines that the marker is not present in a case where the contrast ratio and the size are not equal to or larger than the certain value. In addition, in a case where a beacon or the like serves as the reference, the C2X device determines whether a signal of a specific frequency can be detected at a predetermined intensity or more, and in a case where the signal of the specific frequency can be detected, the C2X device determines that the beacon or the like is present, and otherwise, the C2X device determines that the beacon or the like is not present.

In Step S2, the relative position estimation unit 12 calculates a relative distance and a relative direction with respect to the marker, the beacon, or the like serving as the reference. Since the detectable range of the C2X device or the marker reading device is limited to a certain range, a distance to the marker, the beacon, or the like is calculated in order to improve accuracy of position identification. For example, in a case where a two-dimensional barcode serves as the reference, a distance and a relative orientation can be calculated from an apparent size of a timing pattern between cutout symbols. In addition, in a case where a beacon that emits a signal of a specific frequency serves as the reference, it is possible to detect a moment of passing immediately below the beacon by detecting a change of the Doppler frequency, and since the normal beacon is installed at a level different from that of a plane on which the C2X device moves when an automobile travels, it is possible to calculate the distance divided into components in a horizontal direction and a height direction by considering a vehicle speed.

Alternatively, in a case where there are a plurality of beacons, it is possible to observe a frequency change of each beacon and calculate a relative relationship to each beacon in the manner of triangulation.

In Step S3, the relative position estimation unit 12 reads the absolute position information of the marker, the beacon, or the like embedded in a signal acquired from the marker, the beacon, or the like. For example, in a case of the two-dimensional barcode, information related to latitude and longitude, orientation, or the like, and index information for searching a database (not illustrated) may be embedded in a data portion and read. In a case of the beacon or the like, information related to latitude and longitude, orientation, or the like, and index information for searching a database (not illustrated) may be superimposed on the transmission frequency and decoded.

In Step S4, the relative position estimation unit 12 calculates the absolute position of the host vehicle, calculates the traveling direction, and calculates a reliability index for the calculated absolute position or traveling direction. The absolute position and the traveling direction are calculated by consolidating the relative relationship to the marker, the beacon, or the like obtained in Step S2 with the absolute position and installation orientation of the marker, the beacon, or the like obtained in Step S3 at the same timing. In a case of the two-dimensional barcode, it is sufficient if the reliability index is defined as a function in which the reliability is high if there is no difference between the data portion and an error correction code portion using a Reed-Solomon code or the like, and the reliability decreases as the number of bits for which information restoration is performed by error correction processing increases. Even in a case of the beacon or the like, it is sufficient if the reliability index is defined as a function in which the larger the number of differences between the data portion and a checksum, the lower the reliability. Alternatively, in a case of external recognition using a camera, it is sufficient if a contrast ratio for an illumination environment, a frequency component for a host vehicle behavior, and linearity of an edge for a target state are set as threshold value ranges based on the illumination environment such as twilight or backlight, the host vehicle behavior such as image blurring due to high-speed traveling or sudden turning, and the target state such as contamination or blurring of the observation target, and the reliability index is defined as a function in which the reliability decreases as the number of conditions not satisfying the threshold value range increases. The output of the function defined in this manner may be output as the reliability index.

In Step S5, the calculation result in the relative position estimation unit 12 is output to the subsequent processing. The content of the output includes one or more of the absolute positions of the host vehicle, the traveling direction, the reliability index, and the time information when the absolute position, the traveling azimuth, and the reliability index are observed. For example, in a case where the host vehicle position estimation unit 10 is mounted in a passenger compartment of the vehicle and is connected to another device via a car area network (CAN), in output processing, the above-described content of the output is reloaded into a packet for CAN output and the packet is transmitted.

<Content of Processing Performed by Traveling State Determination Unit 13>

Next, the traveling state determination unit 13 will be described. The traveling state determination unit 13 calculates a change of the traveling direction and an average vehicle speed based on (1) the vehicle information such as the turning angle and the vehicle speed and (2) the change of the satellite information such as the satellite arrangement and the number of visible satellites, and determines whether the same trend state continues or the traveling state has changed. Hereinafter, a method of determining a traveling state change by the traveling state determination unit 13 will be specifically described.

<Method of Determining Traveling State Change Accompanying Right/Left Turn>

The traveling state determination unit 13 determines the traveling state change based on a right or left turn detected from the vehicle information. Specifically, the right or left turn is made at an intersection or the like as follows, and it is determined that the vehicle has entered or joined a road different from the road on which the vehicle has been traveling so far. Assuming the situations of FIGS. 4 and 5, the traveling behavior of the host vehicle is estimated using observation values from a rotation angle sensor of the axle portion and the steering angle sensor or steering wheel angle sensor described above.

Figure 4:
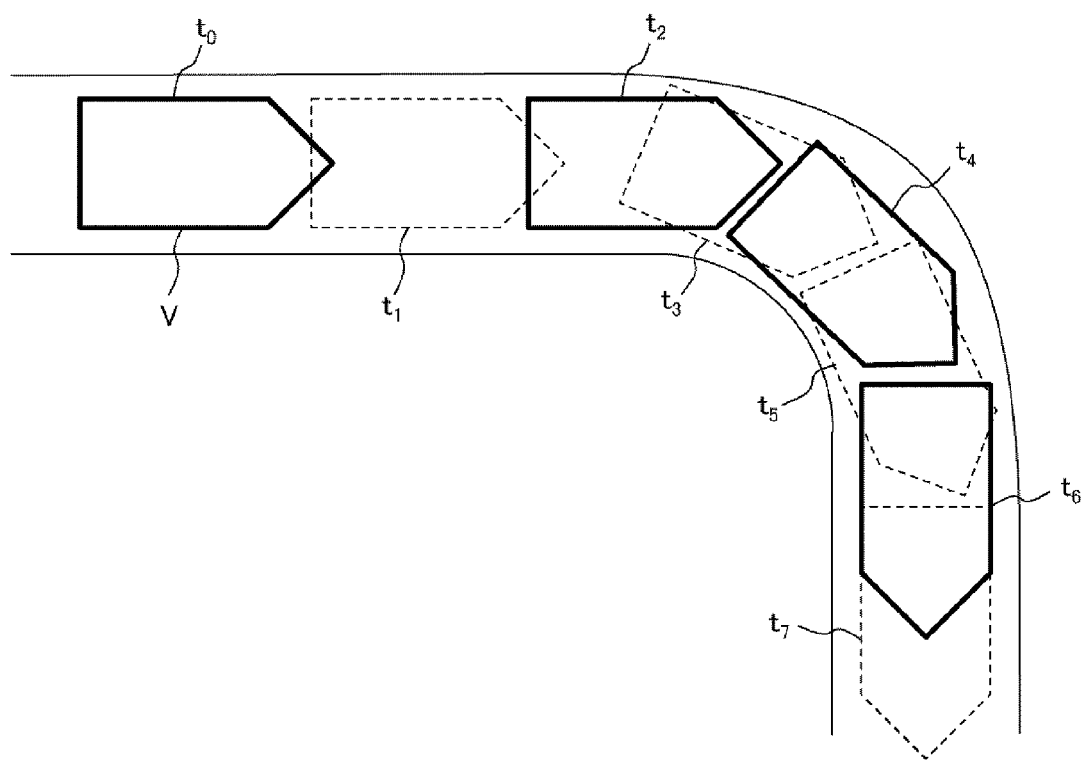
FIG. 4 is a schematic diagram of an example of a traveling vehicle that makes a turn.

FIG. 4 is a schematic diagram when the vehicle V turns right by about 90 degrees. As is clear from the drawing, the vehicle V travels straight from time $t=t_0$ to $t_2$, turns from time $t=t_3$ to $t_5$, and travels straight again after turning from time $t=t_6$ to $t_7$.

FIG. 5 illustrates a steering angle and a turning angle of the vehicle V at this time. By using a vehicle model represented by the Ackermann model, it is possible to calculate the turning angle by modeling the vehicle V that is usually a four-wheeled vehicle as a two-wheeled vehicle including a drive wheel and a steering wheel, calculating a turning radius from the steering angle of the steering wheel, and calculating a traveling distance from a rotation amount of the drive wheel. In a case where the turning angle equal to or larger than a threshold value (thr1) is calculated within a certain period of time as at the time point $t_3$, it is considered that the vehicle has made a right or left turn at an intersection or the like, and has entered or joined a road different from the road on which the vehicle has been traveling so far, and it is determined that the same traveling environment has not continued at a time ($t_2$) before the steering angle starts changing. Further, when the steering angle returns to a neutral state ($t_6$) and remains in the neutral state even after a lapse of a certain period of time, it is determined that the time point ($t_6$) at which the steering angle returns to the neutral state is a timing at which the change of the traveling state ends. Here, the steering angle being in the neutral state refers to a state where the turning angle is equal to or smaller than the certain threshold value (thr1).

When a right or left turn is made at an intersection or the like, a positional relationship with an obstruction on the left and right of the host vehicle changes. For example, in an urban area where structures such as buildings are dense around, traveling in the north-south direction means that there is no building in the north-south direction, that is, a front-rear direction of the host vehicle, and there are buildings in the east-west direction, that is, on the left and right sides of the host vehicle. At this time, a positioning radio wave directly obtained from a positioning satellite in the east-west direction is blocked by a building, and there is a high possibility that a multipath occurs due to reflection by the building or the like even if the positioning radio wave can be received. When the multipath occurs, a transmission distance of the positioning radio wave is longer than that in a case where the positioning radio wave is directly received, and thus, when the positioning of the host vehicle is performed using the positioning radio wave for which the multipath occurs, it is conceivable that a deviation increases in an orientation in which the positioning satellite is present. In the above situation, the multipath is less likely to occur for the positioning radio wave from the positioning satellite present in the north-south direction as viewed from the host vehicle, and the multipath is likely to occur for the positioning radio wave from the positioning satellite present in the east-west direction. Therefore, a result is likely to have a deviation in the east-west direction.

Next, when the traveling direction of the host vehicle changes due to a right/left turn at an intersection, the multipath is less likely to occur for the positioning radio wave from the positioning satellite present in the east-west direction as viewed from the host vehicle, and the multipath is likely to occur for the positioning radio wave from the positioning satellite present in the north-south direction. Therefore, the result is likely to have a deviation in the north-south direction. Such a change in the situation can be switched by detecting a right or left turn at an intersection or the like and determining that the same traveling environment has not continued or determining that it is the timing at which the traveling state change ends.

<Method of Determining Traveling State Change Accompanying Vehicle Speed Change>

The traveling state determination unit 13 determines the traveling state change based on a vehicle speed detected from the vehicle information. Specifically, it is determined that the traveling environment has changed from the road on which the vehicle has been traveling so far by using the vehicle speed as described below.

Figures 6, 7:
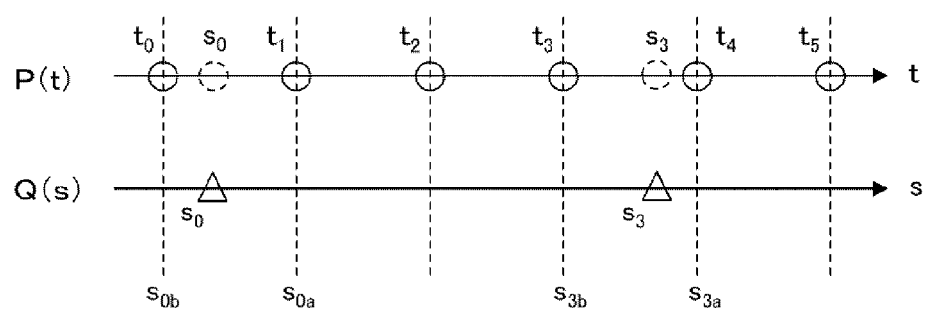
FIG. 6 is a table for discriminating a traveling environment based on a vehicle speed.
FIG. 7 is a schematic diagram illustrating a timing for estimating a host vehicle position.

Usually, the speed limit is set to a low vehicle speed of about 30 km/h in a small environment such as a residential section, and the speed limit is set to about 60 km/h in a highway having a plurality of lanes on one side. Therefore, it is possible to determine the traveling environment change by observing a time-series change of the average vehicle speed during traveling. Specifically, a vehicle speed range and its duration are defined in advance for each traveling environment as illustrated in FIG. 6, and in a case where traveling in a corresponding vehicle speed range continues for its duration or longer, it is determined that the vehicle has transitioned to a corresponding traveling state. Note that the traveling state may be set to an unknown state in a case where the vehicle speed range does not meet any condition due to frequent variation or the like.

Generally, in a small environment such as a residential section, a road width is small and a sidewalk is also narrow, and therefore, a building is present near a traveling path of an automobile in many cases. Under such an environment, surrounding positioning satellites are likely to be obstructed, and a combination of satellites used for positioning is also likely to be frequently switched, so that a positioning result is likely to be unstable. On the other hand, since a main road has a wide traveling lane and further includes a sidewalk, a building is present at a certain distance from a traveling road of an automobile in many cases. Under such an environment, it is easier to directly observe a positioning satellite than in the above-described small environment, and the positioning result is likely to be stable. In a case where the positioning result changes from an unstable state to a stable state or vice versa, such a change in the situation can be switched by determining that the same traveling environment has not continued or determining that it is the timing at which the traveling state change ends.

<Method of Determining Traveling State Change Accompanying Change of Combination of Used Satellites>

The traveling state determination unit 13 determines the traveling state change based on a change of the combination of the used satellites detected from the satellite information. In the satellite positioning, in a case where pseudo distances of three satellites or four satellites or more can be calculated, it is possible to assume spherical surfaces with a center as each satellite position and a radius as a pseudo distance and calculate an absolute position of an observation point as an intersection point of the spherical surfaces. However, since the calculated pseudo distance is generally affected by various errors such as a satellite orbit error, an ionospheric delay error, and a tropospheric delay error, the spherical surfaces do not intersect at one intersection point. Therefore, pseudo distances from more satellites are calculated in advance, and a point close to the intersection point is often calculated by a least squares method or the like. Therefore, when there is a bias in the satellite arrangement used for positioning, for example, when there is a bias in the number of satellites for which the pseudo distance can be calculated in a specific orientation, a bias also occurs in an error in the absolute position of the observation point. Therefore, when the satellite arrangement used for positioning has changed, it is determined whether the same trend state continues or the traveling state has changed.

Specifically, if the used satellite information output from the absolute position estimation unit 11 has changed by a certain number or more (for example, three or more satellites) as compared with a state from a certain time before (for example, 2 seconds before) to a time immediately before the current time, a result indicating that the traveling state has changed is output. In addition, in a case where the used satellite temporarily changes during a certain time and returns to the original used satellite again, a result indicating that the traveling state has not changed is output.

For example, in a case where five satellites $G_1$ to $G_5$ at time $t_{-2}$, five satellites $G_1$ to $G_4$ and $G_6$ at time $t_{-1}$, and six satellites $G_1$ to $G_4$, $G_6$, and $G_7$ at time to are positioning satellites, it is determined that the traveling state has changed. On the other hand, in a case where five satellites $G_1$ to $G_5$ at time $t_{-2}$, three satellites $G_1$ to $G_3$ at time $t_{-1}$, and five satellites $G_1$ to $G_5$ at time to are positioning satellites, it is determined that the traveling state has not changed.

<Method of Determining Traveling State Change Accompanying Change of Accuracy of Positioning Result>

The traveling state determination unit 13 determines the traveling state change based on a change of accuracy of the positioning result detected from the satellite information. In the satellite positioning, as described above, when the absolute position of the observation point is calculated from pseudo distances of a plurality of positioning satellites, a dilution of precision (DOP) such as a geometric dilution of precision (GDOP) and a position dilution of precision (PDOP) related to spatial coordinates can be calculated based on an observation vector. This is a numerical value calculated according to the positioning satellite arrangement in the sky. In addition, there are estimation accuracy indexes of the calculated absolute position, such as an index based on a value of a loss function at the time of calculating the absolute position by the least squares method described above and a positioning status such as 3D positioning or 2D positioning. Alternatively, an accuracy index (accuracy value) unique to a GNSS receiver manufacturer may be output, but the estimation accuracy indexes are used without being particularly distinguished in the present embodiment. It is determined whether the same trend state continues or the traveling state has changed by determining whether these estimation accuracy indexes are stable, have greatly changed, or the like.

Specifically, it may be determined that the traveling state has changed in a case where there is a change in which pDOP is equal to or more than a threshold value (for example, 1.0 or more) within a certain period of time (for example, 2 seconds). As the threshold value for these accuracy indexes, a fixed value obtained experimentally may be used, or a threshold value appropriate for a corresponding region may be received using a communication unit 18 described later. The same applies to the other estimation accuracy indexes.

<Content of Processing Performed by Difference Computation Unit 14>

Next, the difference computation unit 14 will be described. In the difference computation unit 14, it is desired to calculate the amount of the difference between the host vehicle positions estimated by the absolute position estimation unit 11 and the relative position estimation unit 12, but since the position estimation is not necessarily performed at the same time, the amount of the difference between the host vehicle positions estimated by both position estimation units is computed after time synchronization is performed as described below.

In the absolute position estimation unit 11, when the absolute position estimation unit 11 is the reception device of the GNSS, the absolute position is obtained at constant intervals of about 0.1 seconds to 1 second. Meanwhile, in the relative position estimation unit 12, position information of the marker, the beacon, or the like and a relative position from them are obtained at inconstant intervals of about several seconds to several minutes. Therefore, the difference computation unit 14 computes the difference in accordance with the output timing of the relative position estimation unit 12 or a time corresponding to the time information at which the marker, the beacon, or the like included in the content of the output of the relative position estimation unit 12 has been observed.

For example, the difference computation unit 14 converts the output of the absolute position estimation unit 11 into a value matching the output timing of the relative position estimation unit 12 by using linear interpolation to compute the difference. Here, the host vehicle position estimated by the absolute position estimation unit 11 at time t is defined as P(t), and the host vehicle position estimated by the relative position estimation unit 12 at time s is defined as Q(s). FIG. 7 is a diagram schematically illustrating a relationship between estimation timings of P(t) and Q(s), and a time at which the relative position estimation unit 12 estimates Q(s) immediately after time $t_n$ at which the absolute position estimation unit 11 estimates $P(t_n)$ is set as time $s_n$. Note that n is an integer and increases by one every time the absolute position estimation unit 11 performs position estimation. In addition, time $t_n$ immediately before time $s_n$ is defined as time $s_{nb}$, and time $t_{n+1}$ immediately after time $s_n$ is defined as time $s_{na}$. Note that b and a are subscripts indicating before and after, respectively.

In this case, $s_b$ and $s_a$ for $s_1$ and $s_3$ are as follows.

[Math. 1]

$$s_{0b} = t_0, s_{0a} = t_1 \qquad \text{(Expression 1)}$$

[Math. 2]

$$s_{3b} = t_3, s_{3a} = t_4 \qquad \text{(Expression 2)}$$

Here,

[Math. 3]

$$\Delta s_{0b} = s_0 - s_{0b}, \Delta s_{0a} = s_{0a} - s_0 \qquad \text{(Expression 3)}$$

[Math. 4]

$$\Delta s_{3b} = s_3 - s_{3b}, \Delta s_{3a} = s_{3a} - s_3 \qquad \text{(Expression 4)}$$

In this case, the values $P(s_0)$ and $P(s_3)$ obtained by matching the output of the absolute position estimation unit 11 with the output timing of the relative position estimation unit 12 by using linear interpolation can be calculated as follows.

[Math. 5]

$$P(s_0) = \frac{(s_0 - s_{0b}) \times P(s_{0a}) + (s_{0a} - s_0) \times P(s_{0b})}{s_{0a} - s_{0b}} \qquad \text{(Expression 5)}$$

$$= \frac{\Delta s_{0b} \times P(t_1) + \Delta s_{0a} \times P(t_0)}{\Delta s_{0b} + \Delta s_{0a}}$$

[Math. 6]

$$P(s_3) = \frac{(s_3 - s_{3b}) \times P(s_{3a}) + (s_{3a} - s_3) \times P(s_{3b})}{s_{0a} - s_{0b}} \qquad \text{(Expression 6)}$$

$$= \frac{\Delta s_{3b} \times P(t_4) + \Delta s_{3a} \times P(t_3)}{\Delta s_{3b} + \Delta s_{3a}}$$

After calculating $P(s_0)$ and $P(s_3)$ based on the output of the absolute position estimation unit 11 in this manner, the difference computation unit 14 calculates a difference from $Q(s_0)$ and $Q(s_3)$ of the same time. For this difference calculation, for example, a Euclidean distance obtained by adding the square of a difference in latitude, longitude, and height between the estimated positions and its Euler angle can be used as a difference vector. The difference computation unit 14 outputs the difference vector to the learning unit 15.

<Modification of Content of Processing Performed by Difference Computation Unit 14>

The above is an example in which the output of the absolute position estimation unit 11 is converted into a value matching the output timing of the relative position estimation unit 12 by using linear interpolation. However, the difference computation unit 14 may perform secondary interpolation, bicubic interpolation, or the like by further using preceding and subsequent points. As a result, accuracy of interpolation approximation is improved, and an effect of improving the accuracy of the calculated difference can be expected.

Furthermore, in a case where the output frequency of the relative position estimation unit 12 is higher than the output frequency of the absolute position estimation unit 11, or in a case where the interval is several times longer which is relatively close, the difference computation unit 14 may convert the output of the relative position estimation unit 12 into a value matching the output timing of the absolute position estimation unit 11. As a result, the difference calculation can be periodically performed in accordance with the output timing of the absolute position estimation unit 11, and an effect that a correction amount update timing in the learning unit 15 and the position correction unit 16 comes earlier can be expected.

Furthermore, the difference computation unit 14 may calculate, as the difference vector to be calculated after the host vehicle position is synchronized, a vector divided into a front-rear component, a left-right component, and a height component in the traveling direction at that time. As a result, the position correction unit 16 can finely perform the position correction separately in the front-rear direction and the left-right direction with respect to the traveling direction of the host vehicle.

<Content of Processing Performed by Learning Unit 15>

Next, the learning unit 15 will be described. The learning unit 15 accumulates the amount of the difference calculated by the difference computation unit 14 as time-series data, and calculates the correction amount for the absolute position estimation unit 11 based on the accumulated time-series data. For example, the simplest form is a method in which learning is performed at a timing at which the difference computation unit 14 computes the amount of the difference, and the amount of the difference is adopted as the correction amount as it is. This method can be used in a case where the reliability of the relative position estimation unit 12 is high, and it is assumed that a recognition error of the marker and the transmitter recognizable by the relative position estimation unit 12 is sufficiently small, and the correction amount is generated in such a way as to match the host vehicle position based on the recognition result. As described above, since the correction amount for the absolute position estimation unit 11 can be determined immediately after the position information is detected by computation starting from a timing at which the difference computation unit 14 outputs the computation result, that is, a timing at which the relative position estimation unit 12 observes the position information of the marker, the beacon, or the like, there is an effect that the correction can be started immediately after the latest result of the relative position estimation unit 12 is calculated.

Furthermore, the learning unit 15 may reset a learning state when the traveling state change is completed, and calculate the correction amount for the position information obtained from a plurality of markers, beacons, or the like based on a statistics value of the observation result. Specifically, once a determination result indicating that it is the timing at which the traveling state change ends is received from the traveling state determination unit 13, the learning state or the correction amount up to that time is reset. Furthermore, after the output of the difference computation unit 14 obtained thereafter is received a plurality of times, a value at which the loss function is minimized can be determined as the correction amount based on the least squares method when the variance is equal to or less than a threshold value. Alternatively, a maximum likelihood estimation method may be used. In this way, instability of an external recognition result can be removed, and an effect of improving reliability of the estimated position can be expected.

Furthermore, the learning unit 15 may use the reliability index of the relative position estimation unit 12. As described above, recognition performance is degraded depending on the use of error correction information, the illumination environment, the host vehicle behavior, and the target state. Therefore, such information from the marker, the beacon, or the like whose reliability index is equal to or less than the threshold value may be excluded from learning data, or the correction amount may be calculated without placing importance on the information. Specifically, in a case of the above-described least squares method, an influence of a data point having a small reliability index is reduced by multiplying a corresponding data point by a coefficient smaller than 1 and adding the multiplied data point at the time of calculation of the loss function, and an effect of improving the reliability of the estimated position can be expected.

<Content of Processing Performed by Position Correction Unit 16>

Figure 8:
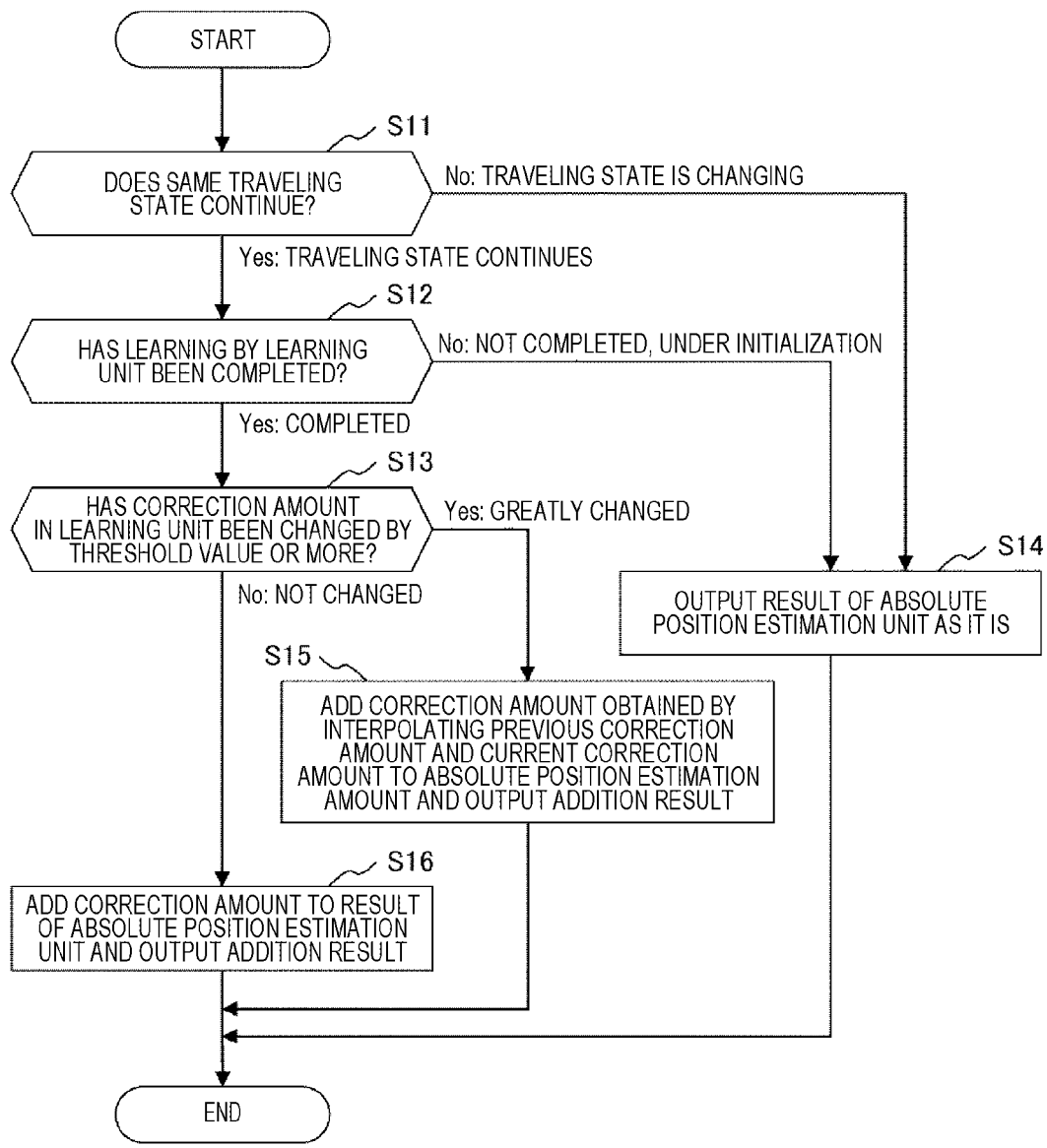
FIG. 8 is a flowchart illustrating a content of processing performed by a position correction unit.

Next, the position correction unit 16 will be described with reference to the flowchart of FIG. 8. The flowchart illustrated in FIG. 8 is executed every time the absolute position estimation unit 11 outputs the host vehicle position. The position correction unit 16 receives the outputs of the absolute position estimation unit 11, the traveling state determination unit 13, and the learning unit 15, and outputs a corrected estimated position and an error index.

In Step S11, the position correction unit 16 determines whether or not the same traveling environment continues based on the output of the traveling state determination unit 13. In a case where the traveling state determination unit 13 determines that the same traveling environment is not continued and the traveling state is changing (No branch), the correction with the correction amount in the learning unit 15 is not appropriate, and thus the output value of the absolute position estimation unit 11 is output without using the correction amount (Step S14). On the other hand, in a case where it is determined in Step S11 that the same traveling state continues (Yes branch), the processing proceeds to Step S12.

In Step S12, the position correction unit 16 determines whether or not learning by the learning unit 15 has been completed. In a case where the learning of the learning unit 15 has not been completed (No branch), since the correction with the correction amount in the learning unit 15 is not appropriate, the output value of the absolute position estimation unit 11 is output as it is without using the correction amount (Step S14). On the other hand, in a case where the learning of the learning unit 15 has been completed or the correction amount is determined only by one output result of the relative position estimation unit 12 (Yes branch), the processing proceeds to Step S13.

In Step S13, the position correction unit 16 determines whether or not the correction amount in the learning unit 15 has changed by a threshold value or more as compared with the previous correction amount.

In a case where the correction amount output from the learning unit 15 has greatly been changed by the threshold value or more from the correction amounts up to the previous time (Yes branch), the processing proceeds to Step S15. In Step S15, the position correction unit 16 adds the correction amount obtained by interpolating the previous correction amount and the current correction amount to an absolute position estimation amount and outputs the addition result in order to alleviate a correction amount variation. Specifically, $\Delta c(N)\Delta x(t-N)+\Delta c(N-1)\Delta x(t-N+1)+ \ldots +\Delta c(1)\Delta x(t-1)+\Delta c(0)\Delta x(t)$ may be used as the current correction amount, in which $\Delta x(t-N)$, $\Delta x(t-N+1)$, ..., and $\Delta x(t-1)$ represent the correction amounts output from the learning unit 15 up to the previous time, and $\Delta x(t)$ represents the current correction amount output from the learning unit 15. Here, $\Sigma \Delta c(t)=1$ and $t=t_0$ to $t_1$.

On the other hand, in Step S13, in a case where the correction amount has not been changed by the threshold value or more from the correction amounts up to the previous time (No branch), the processing proceeds to Step S16. In Step S16, the position correction unit 16 considers that a stable correction amount has been obtained from the learning unit 15, adds the correction amount from the learning unit 15 to the result from the absolute position estimation unit 11, and outputs the addition result.

In Steps S14, S15, and S16, the position correction unit 16 calculates the accuracy index. For example, this accuracy index is, for example, an error circle radius, and in Step S14, it is sufficient if the accuracy index output by the absolute position estimation unit 11 is output as it is. For example, in Step S15, it is sufficient if $\Delta c(N)\Delta R(t-N)+\Delta c(N-1)\Delta R(t-N+1)+ \ldots +\Delta c(1)\Delta R(t-1)+\Delta c(0)\Delta R(t)$ may be used as the current accuracy index, in which $R(t-N)$, $R(t-N+1)$, ..., and $R(t-1)$ represent the accuracy indexes output from the absolute position estimation unit 11 up to the previous time, and $R(t)$ represents the current accuracy index output from the absolute position estimation unit 11. In Step S16, the reliability index of the relative position estimation unit 12 may be multiplied by an appropriate multiplier to be converted into the accuracy index.

The output from the position correction unit 16 described above is performed in accordance with the output timing of the absolute position estimation unit 11 although there is a delay corresponding to various processing times. Since the absolute position estimation unit 11 periodically acquires positioning information of the GNSS or the like at about 2 Hz, the position correction unit 16 can also be expected to perform the output at a constant cycle. In the automated driving system, it is necessary to always acquire where the host vehicle is traveling, and thus the configuration of the present embodiment can meet the needs of the automated driving system.

As described above, with the vehicle control device according to the present embodiment, as an appropriate correction amount (offset) of a positioning position is learned according to a traveling environment and a traveling state, and an influence of a traveling state change is removed, it is possible to frequently perform highly accurate estimation of a host vehicle position in a map even if the traveling environment and the traveling state change.

Second Embodiment

Next, a host vehicle position estimation unit 10 according to a second embodiment of the present invention will be described. An overlapping description of the common points with the first embodiment will be omitted.

Figure 9:
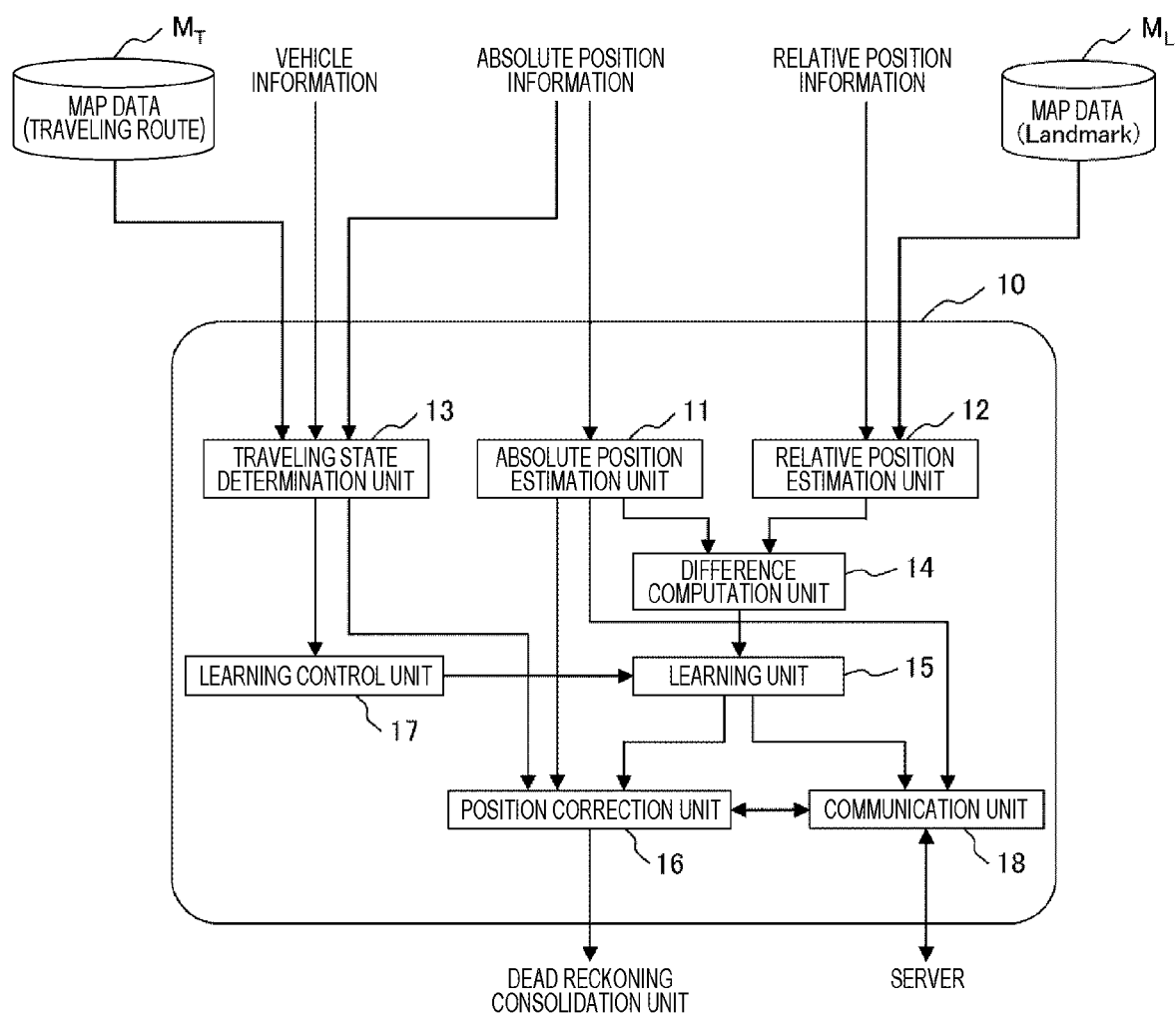
FIG. 9 is a block diagram of a host vehicle position estimation unit according to a second embodiment.

FIG. 9 is a block diagram illustrating the host vehicle position estimation unit 10 according to the present embodiment. As illustrated herein, the host vehicle position estimation unit 10 includes a learning control unit 17 and the communication unit 18 in addition to an absolute position estimation unit 11, a relative position estimation unit 12, a traveling state determination unit 13, a difference computation unit 14, a learning unit 15, and a position correction unit 16. In addition, map data $M_T$ including traveling route information is also input to the traveling state determination unit 13 of the present embodiment, and map data $M_L$ including landmark information is also input to the relative position estimation unit 12 of the present embodiment. Note that the map data $M_T$ and the map data $M_L$ of the present embodiment are part of the map data M of FIG. 1. Hereinafter, details of each unit will be described focusing on the features of the present embodiment.

<Absolute Position Estimation Unit 11>

Since the absolute position estimation unit 11 is similar to that of the first embodiment, a description thereof will be omitted.

<Relative Position Estimation Unit 12>

The relative position estimation unit 12 estimates the host vehicle position with high accuracy by using an external recognition sensor, a C2X device, or a marker reading device. The external recognition sensor, the C2X device, or the marker reading device obtains a relative position with respect to an absolute position of a landmark, a marker, or a transmitter present in a traveling environment of the host vehicle, and thus is also referred to as a relative position acquisition sensor 1c. Then, the relative position estimation unit 12 calculates and outputs the absolute position of the host vehicle from the relative position of the host vehicle with respect to the absolute position of the landmark, the marker, or the transmitter. As position information of the landmark, the marker, or the transmitter used at that time, position information stored in the map data M; including the landmark information may be searched for and used, or position information output from the marker or the transmitter may be used as described in the first embodiment.

Since the landmark to be observed by the relative position acquisition sensor 1c has a short distance from the host vehicle and a position error due to diffraction/reflection does not occur, the position estimation result of the relative position estimation unit 12 can be expected to have higher accuracy than the position estimation result of the absolute position estimation unit 11. On the other hand, the estimation of the position and posture of the host vehicle by the relative position estimation unit 12 is performed only in a place where the landmark exists or a place where C2X communication is established. Therefore, it can be said that it is discrete in terms of time or space.

The external recognition sensor will be described. The external recognition sensor refers to a measurement device such as a monocular camera, a stereo camera, a lidar, a millimeter wave, or an ultrasonic sensor.

The monocular camera and the stereo camera are imaging devices that image an external situation of a vehicle V. The camera is provided inside a windshield of the vehicle V and inside a rear glass of the vehicle V. The camera may be provided on left and right side surfaces of the vehicle V, or may be provided on an upper portion of a license plate outside a passenger compartment of the vehicle. The camera transmits captured images of the front and rear sides of the vehicle V, and the stereo camera transmits depth information based on binocular parallax to the relative position estimation unit 12.

The lidar, the millimeter wave, and the ultrasonic sensor are each a radar sensor that detects an obstruction in the periphery of the vehicle V by using light, radio waves, sound waves, or the like. The radar sensor transmits light, radio waves, sound waves, or the like to the periphery of the vehicle V and receives the light, the radio waves, the sound waves, or the like reflected by the obstruction to detect obstruction information such as the presence or absence, the type, the speed, and the distance of the obstruction, and transmits the obstruction information to the relative position estimation unit 12. The obstruction herein includes a structure such as a guardrail, a signpost, or a building, and a moving obstruction such as a pedestrian, a bicycle, or another vehicle.

The map data $M_L$ including the landmark information will be described. The map data $M_L$ includes the type and arrangement of a geographical feature recognizable by the external recognition sensor. For example, for the camera, the map data $M_L$ includes a straight line or broken line such as a white line or a yellow line which is a traveling road dividing line, a diagonal line indicating a passage restriction, a speed limit mark or a vehicle type classification mark indicating a traffic rule or a regulation, a temporary stop line, a crosswalk, a guard rail which is a three-dimensional object that enters a field of view during traveling, a traffic light, a sign, a guide sign, a signboard, an appearance of a store or a building, and the like. In addition, for the lidar, the millimeter wave, and the ultrasonic sensor, the map data $M_L$ includes a guard rail, a reflector, a manhole cover, a sign post, and the like.

Next, the map data $M_T$ including the traveling route information will be described. The map data $M_T$ includes road information, structure information, geographical and topographical feature information, and route information. The road information indicates, in addition to point information (node information) of a road and link information of each point information, the number of lanes of a road, a road width, speed regulation information, the presence or absence of a shoulder and a shoulder width, the presence or absence of a sidewalk and a sidewalk width, and the like. The structure information indicates a width and a height of a structure such as a building, a house, or a pedestrian bridge, a relative relationship with a road, the presence or absence of a soundproof wall or a windproof wall installed beside a road, a height of the wall, an inside and outside state of a tunnel or a ceiling portion for protection against falling stones, three-dimensional road information around a bridge or an elevated road, and the like. The geographical and topographical information indicates a land use state of each point such as a residential area, a commercial area, farmlands, or a forest area, and topographical information including undulation information of a road or a land. The route information may be a traveling route generated by the route generation unit 50 or may be created in advance as a fixed traveling route in a case of a moving object traveling on a predetermined course such as a bus.

<Traveling State Determination Unit 13>

The traveling state determination unit 13 has one or both of a function of determining that the same traveling environment continues and a function of determining a timing at which a traveling state has changed, because a deviation tendency of the GNSS changes due to a change of (1) vehicle information such as a turning angle and a vehicle speed, (2) satellite information such as satellite arrangement and the number of visible satellites, and (3) map information including a three-dimensional object environment such as topography and surrounding structures. For the vehicle information and the reception environment, parameter numerical values are accumulated as time-series information, and it is determined that the traveling state has changed in a case where a predetermined parameter numerical value has changed, a case where a change amount during a certain time has exceeded a predetermined threshold value, a case where accumulation of a change amount of a parameter has exceeded a certain value, or the like. In addition, the traveling state determination unit 13 transmits the output result to the learning control unit 17.

<Learning Control Unit 17>

The learning control unit 17 controls initialization of a learning state of the learning unit 15, updating of the learning content, a learning frequency, and the like, and specifically, the learning control unit 17 accumulates the result of the traveling state determination unit 13 and outputs a learning instruction to the learning unit 15 based on the time-series information. For example, performance improvement can be expected by changing the behavior of the learning unit 15 between a case of traveling on a suburban highway for a long time and a case of traveling on a narrow road in an urban area while repeating right and left turns.

In a case where the vehicle travels on a suburban expressway for a long time, it can be expected that the same traveling state continues and highly accurate position estimation by the relative position estimation unit 12 is performed a plurality of times. Therefore, a learning instruction to output the mode value by using a plurality of results obtained within a certain period of time by the difference computation unit 14 may be output to the learning unit 15.

On the other hand, in a case where the vehicle travels on a narrow road in an urban area while repeating right and left turns, the traveling state is switched in a short time. Therefore, a learning instruction to output a difference between the outputs of the absolute position estimation unit and the relative position estimation unit output by the difference computation unit 14 at a time point at which the marker is first observed and the relative position estimation unit 12 outputs the estimated position after the traveling state determination unit 13 outputs a change timing of the traveling state such as a right or left turn may be output as it is to the learning unit 15.

<Difference Computation Unit 14>

Since the difference computation unit 14 is similar to that described in the first embodiment, a description thereof will be omitted.

<Learning Unit 15>

The learning unit 15 calculates a correction amount for correcting the estimated position from the absolute position estimation unit 11 based on an amount of the difference calculated by the difference computation unit 14 and the learning instruction output from the learning control unit 17. For example, in a case where a learning instruction to output the mode value by using a plurality of results obtained within a certain period of time is output as the learning instruction from the learning control unit 17, the amount of the difference within the certain period of time is accumulated and the mode value thereof is output. In addition, a reliability index of the correction amount output by the learning unit 15 may also be output based on a time from obtaining the difference information from the difference computation unit 14, an estimated error amount of the absolute position estimation unit 11, and an estimated error amount of the relative position estimation unit 12.

<Position Correction Unit 16 and Communication Unit 18>

The position correction unit 16 receives the outputs of the absolute position estimation unit 11, the traveling state determination unit 13, and the learning unit 15, corrects the estimated position from the absolute position estimation unit 11, outputs the correction result, and bidirectionally inputs and outputs information to and from the communication unit 18. For example, in a state where the traveling state determination unit 13 determines that the same traveling state continues, the correction amount of the learning unit 15 is used as it is, and a position corrected by adding the correction amount to the position output from the absolute position estimation unit 11 is output. On the other hand, in a state where the traveling state determination unit 13 determines that the traveling state is not continued, the position obtained by correcting the position output from the absolute position estimation unit 11 is output using a value obtained by decreasing the correction amount of the learning unit 15 by a predetermined ratio, and a date and time, vehicle type information of the host vehicle, and the like are also transmitted to the communication unit 18 in addition to the output position and a learning amount. When correction information is received from the outside of the vehicle via the communication unit 18, which of the correction information from the communication unit 18 and the correction information from the learning unit 15 is used may be determined based on the reliability index of the correction amount obtained from the learning unit 15.

The input and output to and from the above-described communication unit 18 will be described. In addition to the position output from the position correction unit 16 and the learning amount, the communication unit transmits information such as the date and time, the vehicle type information of the host vehicle, the reliability index from the learning unit 15, and the host vehicle position from the absolute position estimation unit 11 to a server (not illustrated).

Processing in the server (not illustrated) is not directly related to the present invention, and thus will not be described in detail here. However, for example, the output position, the learning amount, the date and time, the vehicle type information of the host vehicle, the reliability index of learning, the host vehicle position, and the like transmitted from a plurality of vehicles to which the present invention is applied are accumulated, and positioning satellite arrangement that can be estimated from the date and time, and a correction amount for each type such as an antenna height of a positioning sensor that can be estimated from the vehicle type information and a traveling point are accumulated, whereby it becomes possible to estimate what kind of deviation is superimposed on an absolute position sensor at certain longitude and latitude at a certain date and time when a specific vehicle travels in an environment of specific satellite arrangement. It is assumed that such an estimated value is transmitted to the communication unit 18 of the vehicle traveling at corresponding longitude and latitude at a corresponding date and time.

In this way, the communication unit 18 can obtain the correction information from the server (not illustrated), and can transmit the correction information to the position correction unit 16.

Next, a content of processing performed by each unit according to the present embodiment will be described using a flowchart as necessary.

<Content of Processing Performed by Absolute Position Estimation Unit 11>

The absolute position estimation unit 11 outputs not only a positioning position but also the satellite information indicating a satellite that has transmitted the positioning radio wave used to calculate the positioning position (the satellite used for positioning) and a radio wave strength from each satellite. Details of the processing are similar to those described in the first embodiment, and thus are omitted.

<Content of Processing Performed by Relative Position Estimation Unit 12>

Figure 10:
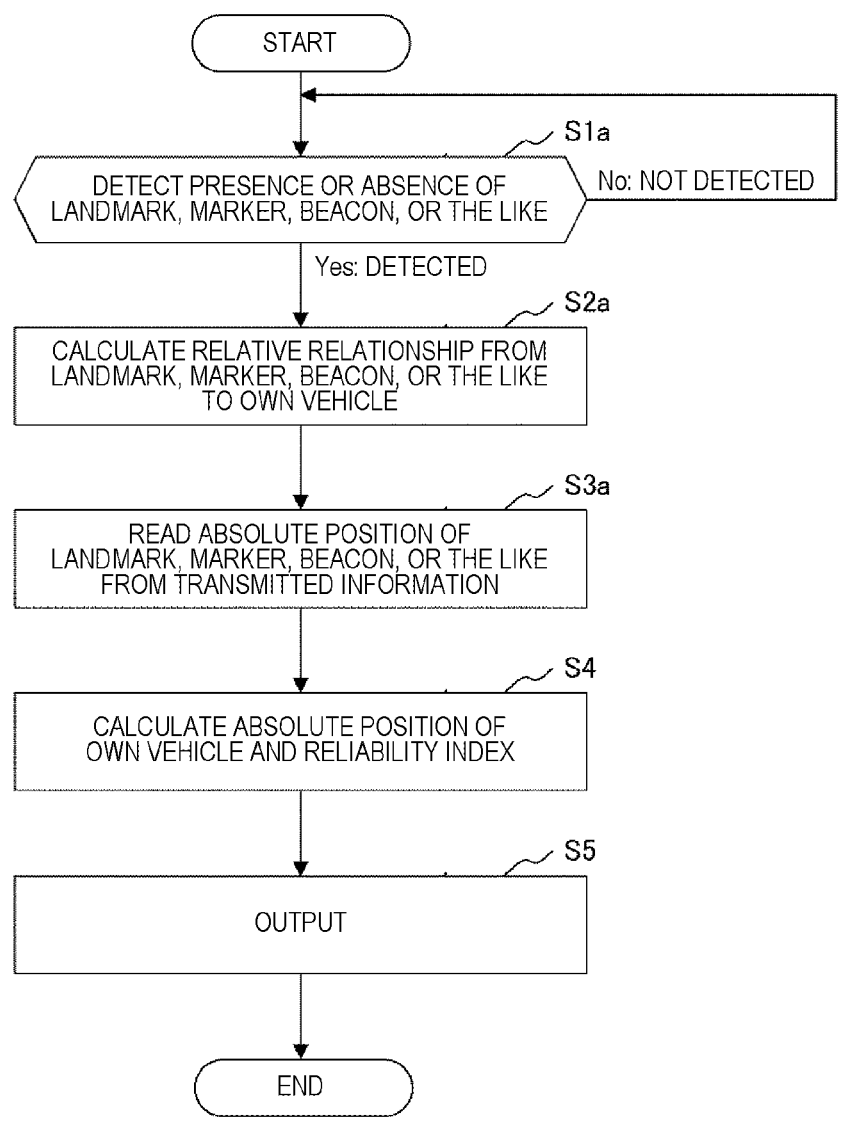
FIG. 10 is a flowchart illustrating a content of processing performed by a relative position estimation unit according to the second embodiment.

A content of processing performed by the relative position estimation unit 12 will be described with reference to the flowchart of FIG. 10. The flowchart illustrated in FIG. 10 is continuously executed during the host vehicle position estimation operation of the host vehicle position estimation unit 10.

In Step S1$a$, the relative position estimation unit 12 determines the presence or absence of a landmark, a marker, a beacon, or the like serving as a reference for obtaining the relative position of the host vehicle. When a landmark, a marker, a beacon, or the like is present within a detectable range of the external recognition sensor, the marker reading device, the C2X device, or the like, which is a specific example of the relative position acquisition sensor 1$c$, the relative position estimation unit 12 can estimate the absolute position of the host vehicle, and thus, first, the presence or absence of a landmark, a marker, a beacon, or the like is determined based on outputs of these devices.

A case where a marker or a beacon serves as the reference has been described in the first embodiment and thus is omitted, and here, a method of recognizing a landmark by using the map data $M_L$ and the external recognition sensor will be described in detail. For example, a use case of recognizing a crosswalk mark by using a camera which is a specific example of the external recognition sensor will be described. The crosswalk mark is a road mark having a periodic pattern in which three or more white lines having a width of 0.6 m are arranged at intervals of 0.6 m in such a way as to cross the vehicle traveling road, mainly at an intersection or the like.

In the map data $M_L$, a length of a white line of a crosswalk mark at an intersection, a relative relationship of an end point, a white line angle, or the like, the number of white lines, the presence or absence of a side line, and the like are stored, and landmark information around the host vehicle is input to the relative position estimation unit 12 based on the host vehicle position estimated by the absolute position estimation unit 11. Specifically, the host vehicle position, the host vehicle traveling direction, and the host vehicle speed are obtained from the absolute position estimation unit 11 although a deviation is included since the deviation is not corrected. Therefore, it is possible to calculate the host vehicle position after time T has elapsed by considering a movement vector in which the host vehicle traveling direction is a direction of the vector and the length of the vector is obtained by multiplying the host vehicle speed by time T and adding the movement vector to the current host vehicle position. A section between the host vehicle position and the host vehicle position after the time T elapses and a margin region of a certain additional range in this section are considered, and the landmark information included in the margin region is output in ascending order of distance from the host vehicle, whereby the landmark information can be output to the relative position estimation unit 12 in the order of appearance of the landmark on the course of the host vehicle.

Once the landmark information of the crosswalk mark indicating that the crosswalk mark is present on the course of the host vehicle is received from the map data $M_L$, the crosswalk mark is detected by the camera in Step S1$a$. This crosswalk mark detection will be described with reference to the schematic diagram of FIG. 11. $D_1$ is an image before processing input from the camera. In Step S1$a$, vertical edge detection is performed on the input image for the crosswalk mark detection to obtain $D_2$. Thereafter, labeling or the like, which is an existing technology, is performed on $D_2$ to extract line segment elements, thereby obtaining end point coordinates and a length. Among the line segment elements, line segment elements having similar lengths that do not exceed a threshold value are grouped, and then end point coordinates having a constant interval are extracted for each group to obtain $D_3$. Note that this interval is affected by lens distortion of the camera and may thus vary without exceeding a threshold value. As described above, since the crosswalk mark has three or more periodic white line elements, an end point coordinate group having a constant interval of six points or more of upper and lower ends of the line segment elements is obtained.

Furthermore, since the crosswalk mark is present on the traveling road, it is possible to estimate a vanishing point or a height of a horizon in the image in consideration of an installation angle of the camera with respect to an automobile body, an installation height of the camera, and an angle of view of the camera, and $D_4$ can be extracted as a line segment element present on the road surface. In a case where such an end point coordinate group is extracted, it is determined that the crosswalk mark has been recognized.

In addition, in a case where the landmark is a sign such as a maximum speed limit sign, since the shape, characters, and the like are defined, a template image corresponding to the sign type is prepared in advance, and the presence or absence of the sign is determined by collating the template image with the camera image. Specifically, in consideration that the apparent size varies depending on the distance, the template image enlarged or reduced to a plurality of sizes is superimposed and correlated with a part of the image input from the camera while being sequentially shifted, and it is determined whether or not recognition has been made using a method (template matching method) of determining that the detection target is present at a place where the correlation value is equal to or more than a threshold value. Similarly to the above-described crosswalk mark, a region where the sign is detected in the image may be limited in consideration of the installation angle of the camera with respect to the automobile body, the installation height of the camera, and the angle of view of the camera.

Further, many existing technologies have been disclosed for road marks other than crosswalk mark and structures, and thus it is possible to determine whether or not there is a target by using these technologies.

In this way, in Step S1a, it is determined whether or not a landmark, a marker, a beacon, or the like is present. In a case where a landmark, a marker, a beacon, or the like is present (Yes branch), the processing proceeds to Step S2a, which is the next step. In a case where there is no landmark, marker, beacon, or the like (No branch), the presence or absence of a landmark, a marker, a beacon, or the like is detected again.

In Step S2a, the relative position estimation unit 12 calculates a relative distance and a relative direction with respect to the landmark, the marker, the beacon, or the like serving as the reference. Since the detectable range of the external recognition sensor, the C2X device, or the marker reading device is limited to a certain range, a distance to the landmark, the marker, the beacon, or the like is calculated in order to improve accuracy of position identification. A case where a marker or a beacon serves as the reference has been described in the first embodiment and thus is omitted, and here, a method of recognizing a landmark by the external recognition sensor using the map data $M_L$ will be described.

For example, a use case of recognizing a crosswalk mark using a camera will be described. It is assumed that, in the processing of Step S1a described above, it is determined that a landmark is present, and an end point coordinate group of the upper and lower ends of the line segment elements extracted as the crosswalk mark is obtained. In a case where the installation angle of the camera with respect to the automobile body, the installation height of the camera, the angle of view of the camera, and the lens distortion of the camera are used, and the road surface immediately below the host vehicle is assumed to be flat at least up to the crosswalk mark, it is possible to calculate, when it is assumed that there is a crosswalk mark on the road, a distance to the crosswalk mark. Further, the angle of the host vehicle with respect to the crosswalk mark can be calculated by calculating the angle of arrangement of the end points of the end point coordinate group.

Note that, in a case where the assumption that the traveling road surface immediately below the host vehicle is flat at least up to the crosswalk mark is not established, for example, even if the road surface has a slope or a curve with a bank angle, the distance to the landmark can be calculated from the map data $M_L$ by using the size information of the landmark. For example, a case of the crosswalk will be described with reference to FIG. 12.

Figure 12:
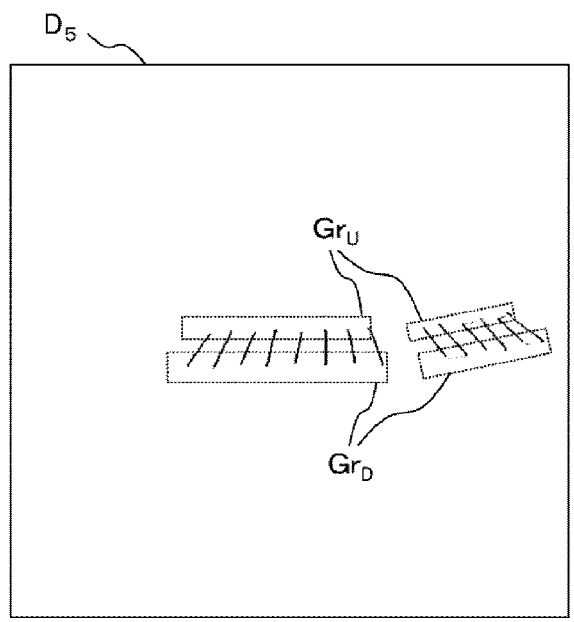
FIG. 12 is an explanatory diagram when a relative relationship with a crosswalk on an inclined road is calculated.

As illustrated in FIG. 12, as coordinates of a point group $Gr_U$ at the upper end and a point group $Gr_D$ at the lower end are used, a distance to the crosswalk mark and a ground inclination angle thereof can be calculated. Hereinafter, each point group Gr includes a plurality of points, but the center of gravity point is treated as a representative point for convenience. A distance from an arbitrary point A to an arbitrary point group Gr refers to a distance from the point A to the representative point of the point group Gr. Since a distance between the end point coordinates is 0.6 m according to the standard of the crosswalk as described above, a distance from a camera origin O to the point group $Gr_D$ of the lower end and a distance from the camera origin O to the end point coordinate group $Gr_U$ of the upper end can be calculated using camera information such as the size observed on the image and the angle of view.

Figure 13:
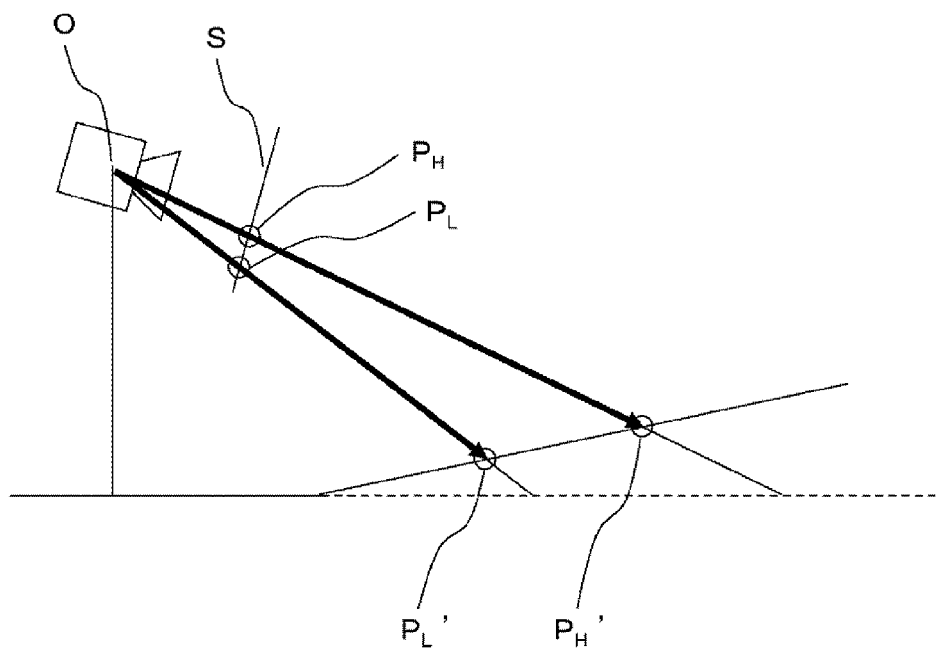
FIG. 13 is an explanatory diagram when a relative relationship with a crosswalk on an inclined road is calculated.

Here, as illustrated in FIG. 13, as the camera origin O and a projection plane S are fixed, and points $P_{H'}$ and $P_{L'}$ passing through points $P_H$ and $P_L$ on the projection plane S from the camera origin O and having determined distances are determined, an inclination of a straight line passing through the two points can be determined. Therefore, the inclination of the road surface can be estimated from the distance from the camera origin O to the point group $Gr_D$ of the lower end and the distance from the camera origin O to the end point coordinate group $Gr_U$ of the upper end.

In Step S3a, the relative position estimation unit 12 determines absolute position information of the landmark, the marker, the beacon, or the like. A case of the marker or beacon has been described in the first embodiment and thus is omitted, and here, a method of recognizing a landmark by the external recognition sensor using the map data $M_L$ will be described.

For example, in a case where the landmark serving as the reference is a crosswalk, position information such as latitude, longitude, and altitude, an installation orientation of a road mark, a white line length, the number of white lines, the presence or absence of a side line, and the like are stored in the map data $M_L$ for four corner end points $P_1$ to $P_4$ as illustrated in $D_1$ of FIG. 11. In a case where the information such as the number of white lines, the presence or absence of a side line, and the installation orientation in the result of recognizing the crosswalk mark in Step S2a matches the information stored in the map data $M_L$, the latitude and longitude of the end points of the four corners of the crosswalk are used as a read result.

In Step S4, the relative position estimation unit 12 calculates the absolute position of the host vehicle, calculates the traveling direction, and calculates a reliability index for the calculated absolute position or traveling direction. The absolute position and the traveling direction are calculated by consolidating the relative relationship to the landmark, the marker, the beacon, or the like obtained in Step S2a with the absolute position and the installation orientation of the landmark, the marker, the beacon, or the like obtained in Step S3a at the same timing. The reliability index is described in the first embodiment, and thus is omitted. Note that the reliability indexes of a camera for marker recognition and a camera as the external recognition sensor can be defined in the same way.

In Step S5, the calculation result in the relative position estimation unit 12 is output to the subsequent processing. The content of the output includes one or more of the absolute positions of the host vehicle, the traveling direction, the reliability index, and the time information when the absolute position, the traveling azimuth, and the reliability index are observed. For example, in a case where the host vehicle position estimation unit 10 is mounted in a passenger compartment of the vehicle and is connected to another device via a CAN, in output processing, the above-described content of the output is reloaded into a packet for CAN output and the packet is transmitted.

<Case where External Recognition Sensor is Lidar or Millimeter Wave>

Although the example in which the external recognition sensor is a camera has been described above, other external recognition sensors can be basically handled in a similar manner. For example, in a case where a lidar or millimeter wave is used as the external recognition sensor, the detection of whether or not a landmark has been recognized in Step S1a is regarded as a change in reflection intensity in a scanning direction, that is, a spatial change in distance information and material information, and such a change pattern is recorded in the map data $M_L$ in advance, and can be defined as the presence or absence of similarity to the recorded change pattern that is equal to or higher than a threshold value.

In addition, the relative relationship to the host vehicle in Step S2a can be defined with distance information that can be measured by the lidar or millimeter wave as a distance and a bias change of the reflection intensity change in the scanning direction as an angle.

Reading of the landmark from the map data $M_L$ in Step S3a is the same as in a case of the camera.

A method of calculating the absolute position in Step S4 is the same as that in a case of the camera, and the reliability index can be defined as the reflection intensity of the lidar or millimeter wave. In a case of the lidar or millimeter wave, a laser or millimeter wave is emitted to the outside of the passenger compartment of the vehicle and its reflected wave is measured. Therefore, when raindrops, dirt, or the like adhere and sensitivity thus decreases, the measured reflection intensity decreases. Note that it is considered that measurement data obtained at this time is distorted due to raindrops or dirt that non-uniformly adhere, and thus the reliability is lowered.

As described above, with the vehicle control device according to the present embodiment, it is possible to estimate the vehicle position with higher accuracy by using the landmark information or the information obtained from the outside via the communication unit.

Third Embodiment

Next, a host vehicle position estimation unit 10 according to a third embodiment of the present invention will be described. An overlapping description of the common points with the embodiments described above will be omitted.

In the present embodiment, a method in which a relative position estimation unit 12 considers a more detailed recognition characteristic when a landmark is recognized by an external recognition sensor and reflects the recognition characteristic in a correction method will be described.

The third embodiment of the present invention is the same in device configuration as the second embodiment, and the host vehicle position estimation unit 10 further includes map data $M_T$ including traveling route information, map data $M_L$ including landmark information, a learning control unit 17, and a communication unit 18 in addition to an absolute position estimation unit 11, the relative position estimation unit 12, a traveling state determination unit 13, a difference computation unit 14, a learning unit 15, and a position correction unit 16. The internal processing performed by the relative position estimation unit 12, the difference computation unit 14, and the position correction unit 16 described above is different.

Hereinafter, details of each unit will be described while appropriately omitting portions overlapping with the second embodiment.

The recognition characteristic in the relative position estimation unit 12 refers to a characteristic that, depending on the shape of a recognition target, measurement can be performed with high accuracy in a specific direction, but accuracy deteriorates or position identification cannot be made at all in another direction.

The crosswalk mark described above will be described as an example. Normally, when an automobile travels, the automobile passes in such a way as to be orthogonal to the crosswalk mark. At this time, since end points of white lines included in a point group Gr are periodic and there is no feature for distinguishing the white lines from each other, it is difficult to distinguish them when a large number of white lines are arranged. That is, in a case where a large number of white lines are arranged in a left-right direction of the automobile, it is difficult to distinguish the white lines, and there is a possibility that an error occurs when specifying a position in the left-right direction. On the other hand, there is no such periodicity in a front-rear direction of the automobile, that is, a direction in which the automobile enters in such a way as to cross the crosswalk mark (a direction orthogonal to arrangement of the point group Gr), and there is a feature with which the position can be uniquely specified.

Alternatively, taking a white line of a lane division line as an example, when an automobile travels, the automobile usually travels in parallel with the white line of the lane division line. At this time, considering alignment using a boundary between the white line and a road surface such as an asphalt road surface, it is easy to specify the position in the left-right direction of the automobile, but the position cannot be specified because the white line is continuous in the front-rear direction of the automobile.

Since position correction can be easily performed in a specific direction depending on such a shape of the recognition target, only the front-rear direction (vertical direction) for the crosswalk, only the left-right direction (horizontal direction) for the white line, and both the front-rear direction and the left-right direction for the maximum speed limit mark may be defined in advance based on rules.

Alternatively, in the landmark information of the map data $M_L$, information indicating whether or not position correction for each direction is performable is stored for each landmark. As a result, it is possible to separately handle a case where the whole is easily captured by the external recognition sensor and an error in the left-right direction is less likely to occur like a crosswalk in a narrow street, and a case where only a part is captured by the external recognition sensor and an error in the left-right direction is likely to occur like a crosswalk on a multi-lane road where many pedestrians and vehicles are likely to be partially blocked, and there is an effect that it is easy to obtain position information according to an environment.

It is assumed that the relative position estimation unit 12 outputs the position with respect to a direction component with respect to a vehicle traveling direction, defined in advance for each landmark.

The difference computation unit 14 calculates a difference between outputs of the absolute position estimation unit 11 and the relative position estimation unit 12 with respect to the direction component output from the relative position estimation unit 12. Specifically, a state in which information indicating that the host vehicle is traveling north is obtained from the absolute position estimation unit 11 and position information of a north-south direction component is output from the relative position estimation unit 12 with respect to a crosswalk mark installed in an east-west direction on a map is considered. At this time, a difference between the outputs of the absolute position estimation unit 11 and the relative position estimation unit 12 is calculated as a position difference of the host vehicle in the north-south direction, and information indicating that an amount of the difference is not calculated as the position difference of the host vehicle in the east-west direction.

Since the learning unit 15 is the same as that of the second embodiment, a description thereof will be omitted.

The position correction unit 16 corrects the output of the absolute position estimation unit 11 and outputs the corrected output based on the amount of the difference for each direction output from the learning unit 15. In this way, it is possible to consider a more detailed recognition characteristic when a landmark is recognized by the external recognition sensor and reflects the recognition characteristic in the correction method.

REFERENCE SIGNS LIST 100 vehicle control device
1a vehicle information receiving unit
1b absolute position acquisition sensor
1c relative position acquisition sensor
1d actuator
1e HMI
10 host vehicle position estimation unit
11 absolute position estimation unit
12 relative position estimation unit
13 traveling state determination unit
14 difference computation unit
15 learning unit
16 position correction unit
17 learning control unit
18 communication unit
20 dead reckoning consolidation unit
30 map collating unit
40 automated driving control unit
50 route generation unit
M, $M_T$, $M_L$ map data

The invention claimed is:

1. A vehicle control device comprising:
a host vehicle position estimation unit that estimates a position of a host vehicle,
wherein the host vehicle position estimation unit includes:
an absolute position estimation unit that estimates a first vehicle position based on absolute position information acquired from a global navigation satellite system (GNSS);
a relative position estimation unit that estimates a second vehicle position based on relative position information acquired from an outside of the host vehicle;
a traveling state determination unit that determines a change of a traveling state of the host vehicle based on vehicle information or satellite information;
a difference computation unit that computes an amount of a difference between the first vehicle position and the second vehicle position in a state where time synchronization is performed;
a learning unit that accumulates the amount of the difference as time-series data for each traveling state and learns a correction amount of the first vehicle position for each traveling state based on the accumulated time-series data; and
a position correction unit that corrects the first vehicle position based on the correction amount calculated by the learning unit.

2. The vehicle control device according to claim 1, wherein the second vehicle position is a relative position with respect to an absolute position of a marker read by a marker reading device, or a relative position with respect to an absolute position of a transmitter or an access point device received by a C2X device.

3. The vehicle control device according to claim 1, wherein landmark information in which an absolute position of a landmark around the host vehicle is registered is input to the relative position estimation unit, and
the second vehicle position is a relative position with respect to the absolute position of the landmark recognized by an external recognition sensor.

4. The vehicle control device according to claim 3, wherein in the landmark information, information indicating whether or not position correction for each direction is performable is stored for each landmark.

5. The vehicle control device according to claim 1, wherein the traveling state determination unit determines the change of the traveling state of the host vehicle in a case where a right or left turn of the host vehicle is detected or a vehicle speed change of the host vehicle is detected, based on the vehicle information.

6. The vehicle control device according to claim 1, wherein the traveling state determination unit determines the change of the traveling state of the host vehicle in a case where a change of a positioning satellite used to estimate the first vehicle position is detected or in a case where a change of accuracy of a positioning result is detected, based on the satellite information.

7. The vehicle control device according to claim 1, wherein the difference computation unit computes the amount of the difference divided into a front-rear direction and a left-right direction with respect to a traveling direction of the host vehicle, and the position correction unit corrects the first vehicle position separately in the front-rear direction and the left-right direction with respect to the traveling direction of the host vehicle.

8. The vehicle control device according to claim 1, further comprising a learning control unit that controls initialization of a learning state of the learning unit, updating of a learning content, or a learning frequency according to a determination result of the traveling state determination unit.

9. The vehicle control device according to claim 1, further comprising a communication unit that communicates with the outside of the host vehicle,
wherein the position correction unit corrects the first vehicle position based on correction information received from the outside of the host vehicle via the communication unit.

10. The vehicle control device according to claim 1, further comprising:
a dead reckoning consolidation unit that calculates a position of the host vehicle based on the vehicle information and the position of the host vehicle estimated by the host vehicle position estimation unit;
a map collating unit that estimates a position of the host vehicle in a map based on the position of the host vehicle calculated by the dead reckoning consolidation unit and map data; and
an automated driving control unit that controls a steering system, a driving system, and a braking system of the vehicle based on the position of the host vehicle in the map estimated by the map collating unit and a driving route.

11. A host vehicle position correction method of correcting a determined position of the host vehicle, the host vehicle position correction method comprising:
determining a first vehicle position based on absolute position information acquired from a GNSS;
determining a second vehicle position based on relative position information acquired from one or more transmitters outside of the host vehicle;
determining a change of a traveling state of the host vehicle based on vehicle information or satellite information;
computing an amount of a difference between the first vehicle position and the second vehicle position in a state where time synchronization is performed;
accumulating the amount of the difference as time-series data for each traveling state and learning a correction amount of the first vehicle position for each traveling state based on the accumulated time-series data; and
correcting the first vehicle position based on the learned correction amount.

* * * * *